United States Patent
Inoue et al.

(10) Patent No.: US 8,121,012 B2
(45) Date of Patent: Feb. 21, 2012

(54) OBJECTIVE LENS AND OPTICAL INFORMATION RECORDING/REPRODUCING APPARATUS

(75) Inventors: Satoshi Inoue, Saitama (JP); Shuichi Takeuchi, Saitama (JP)

(73) Assignee: HOYA Corporation, Tokyo (JP)

(*) Notice: Subject to any disclaimer, the term of this patent is extended or adjusted under 35 U.S.C. 154(b) by 78 days.

(21) Appl. No.: 12/620,804

(22) Filed: Nov. 18, 2009

(65) Prior Publication Data
US 2010/0124157 A1    May 20, 2010

(30) Foreign Application Priority Data

Nov. 19, 2008  (JP) .................... 2008-295552
Nov. 19, 2008  (JP) .................... 2008-295553

(51) Int. Cl.
*G11B 7/135* (2006.01)
(52) U.S. Cl. ................................. 369/112.23
(58) Field of Classification Search .......... None
See application file for complete search history.

(56) References Cited

U.S. PATENT DOCUMENTS

| | | | |
|---|---|---|---|
| 6,411,442 B1 | 6/2002 | Ota et al. | |
| 7,072,272 B2* | 7/2006 | Yagi et al. | 369/112.23 |
| 7,801,010 B2* | 9/2010 | Maezawa et al. | 369/112.23 |
| 2004/0036972 A1 | 2/2004 | Kimura et al. | |
| 2006/0002279 A1* | 1/2006 | Okamura | 369/112.23 |
| 2006/0280061 A1 | 12/2006 | Koreeda et al. | |
| 2007/0286054 A1 | 12/2007 | Koizumi et al. | |
| 2008/0089207 A1 | 4/2008 | Koreeda et al. | |
| 2008/0106998 A1 | 5/2008 | Ito | |
| 2008/0137517 A1* | 6/2008 | Maezawa et al. | 369/112.23 |
| 2009/0154325 A1 | 6/2009 | Inoue et al. | |
| 2009/0252021 A1 | 10/2009 | Inoue et al. | |
| 2010/0124157 A1* | 5/2010 | Inoue et al. | 369/112.03 |

FOREIGN PATENT DOCUMENTS

| | | |
|---|---|---|
| JP | 2002-236253 | 8/2002 |
| JP | 2006-185563 | 7/2006 |
| JP | 2007-294103 | 11/2007 |
| JP | 2008-123573 | 5/2008 |
| JP | 4193914 | 10/2008 |
| JP | 2008-269786 | 11/2008 |

\* cited by examiner

*Primary Examiner* — Peter Vincent Agustin
(74) *Attorney, Agent, or Firm* — Greenblum & Bernstein P.L.C.

(57) ABSTRACT

An optical information recording/reproducing apparatus for an optical disc using a light beam having a wavelength of λ including: an objective lens that converges the light beam onto a recording surface of the optical disc and satisfies a condition:

$$0.40 < \frac{d \cdot (n-1)}{f^2} < 0.70 \qquad (3)$$

where f represents a focal length (unit: mm) of the objective lens with respect to the wavelength λ, d represents a thickness (unit: mm) of the objective lens along an optical axis of the objective lens, and n represents a refractive index with respect to the wavelength λ; a photoreceptor to receive the beam reflected from the optical disc; a detector to detect quality of a signal, and an objective lens driving unit to tilt the objective lens in a direction to improve the quality of the signal based on a result of detection by the detector.

14 Claims, 14 Drawing Sheets

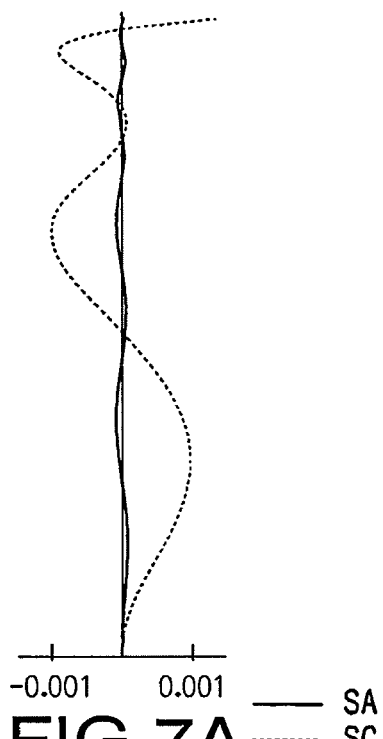
FIG.7A — SA / SC
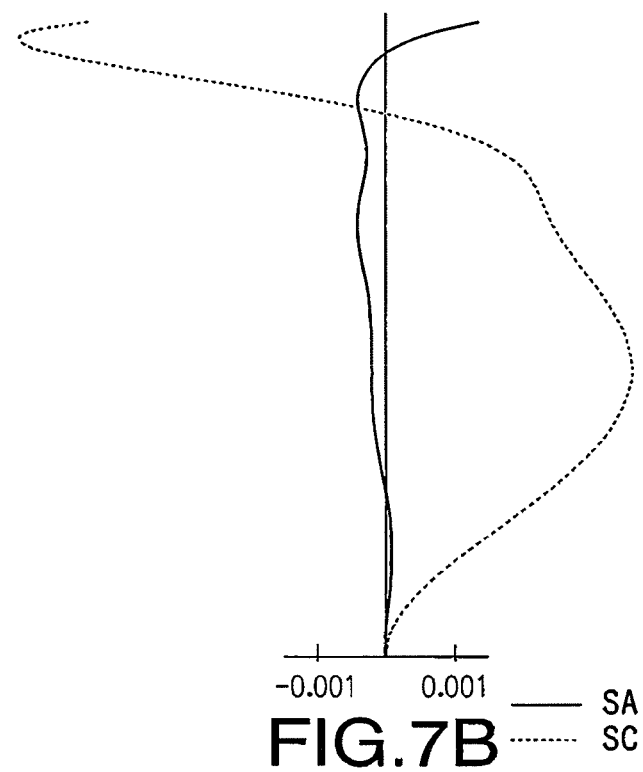
FIG.7B — SA / SC
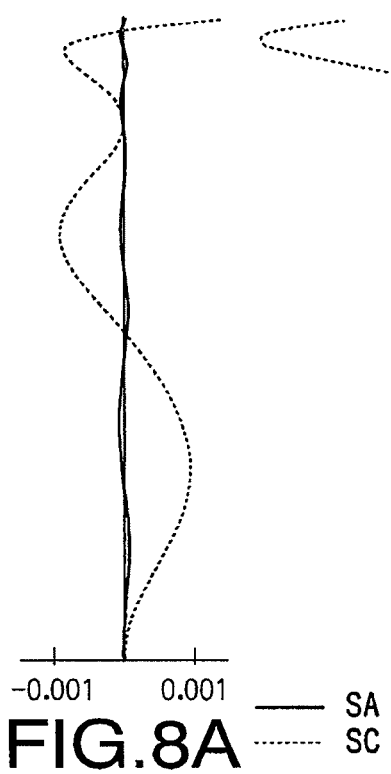
FIG.8A — SA / SC
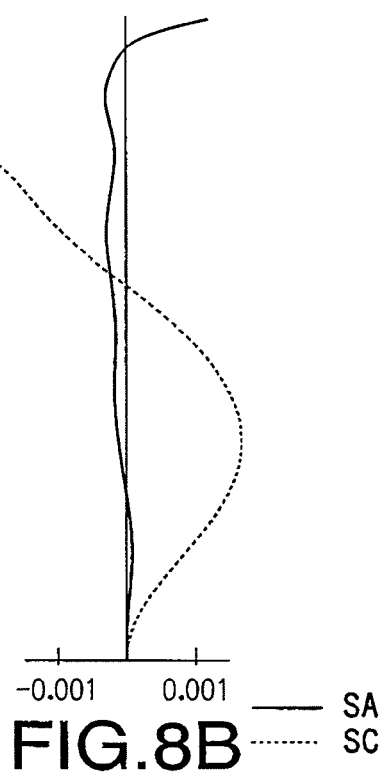
FIG.8B — SA / SC

OBJECTIVE LENS AND OPTICAL INFORMATION RECORDING/REPRODUCING APPARATUS

BACKGROUND OF THE INVENTION

The present invention relates to an optical information recording/reproducing apparatus provided with an objective lens suitable for recording information to and/or reproducing information from an optical disc based on a predetermined standard. More specifically, the present invention relates to an optical information recording/reproducing apparatus provided with an objective lens suitable for information recording/reproducing for a high-recording density optical disc, such as a BD (Blu-ray Disc).

There exist various standards of optical discs (CD, DVD, etc.) differing in recording density, protective layer thickness, etc. Meanwhile, high-recording density optical discs (e.g., BD), having still higher recording density than DVD, are being brought into practical use in recent years to realize still higher information storage capacity. Incidentally, in this specification, the "optical information recording/reproducing apparatuses" include apparatuses for both information reproducing and information recording, apparatuses exclusively for information reproducing, and apparatuses exclusively for information recording.

In general, in order to correct a coma caused when decentering of an objected lens mounted on an optical information recording/reproducing apparatus occurs, a tilt adjustment is performed for the objective lens mounted on the optical information recording/reproducing apparatus during the manufacturing process of the optical information recording/reproducing apparatus in order to correct the coma caused by the decentering. By performing the tilt adjustment, the amount of coma caused as described above can be suitably suppressed. However, optical discs have individual differences, for example, in regard to the degree of warpage and the protective layer thickness. For this reason, there is a case where a relatively large amount of coma is caused due to individual differences of optical discs during the information recording or information reproducing regardless of the fact that the tilt adjustment has been performed. If such a relative large amount of coma occurs, it becomes impossible to form a suitable beam spot on a recording surface of the optical disc.

In order to solve such a drawback, optical information recording/reproducing apparatuses configured to suitably suppress occurrence of a coma due to individual differences of optical discs have been proposed. An example of such an optical information recording/reproducing apparatus is disclosed in Japanese Patent Provisional Publication No. 2006-185563A (hereafter, referred to as JP2006-185563A). The optical information recording/reproducing apparatus disclosed in JP2006-185563A is configured to detect a peak value of a tracking error signal at each of an inner region and an outer region on the optical disc so as to calculate an optimum tilt angle based on an average of the two peak values. In accordance with the calculated tilt angle, the apparatus performs the tilt adjustment for the objective lens. Since, according to JP2006-185563A, an optimum tilt angle is calculated for the optical disc being mounted on the apparatus (i.e., a particular tilt angle for the optical disc being used is calculated), the occurrence of the coma due to individual differences of optical discs is effectively suppressed.

SUMMARY OF THE INVENTION

Incidentally, with regard to an objective lens made of resin, an offence against the sine condition changes due to the temperature change, and the amount of coma with respect to a certain tilt angle varies (i.e., sensitivity relating to occurrence of a coma varies). Since the objective lens designed suitably for information recording and/or information reproducing (information recording/reproducing) for the high recording density optical disc has a larger numerical aperture (NA) than those for CD and DVD, the change of the amount of coma with respect to a certain tilt angle due to the temperature change becomes more noticeable for the high recording density optical disc.

Therefore, even if the tilt adjustment has been conducted to correct the coma, the coma occurs due to the temperature change. That is, it is impossible to effectively remove the coma due to the temperature change. Furthermore, with regard to the high density optical disc such as BD, the tolerance to aberrations is lower than those of other types of optical discs such as CD and DVD. Therefore, with regard to BD, occurrence of the coma becomes a significant problem in comparison with other types of optical discs.

Japanese Patent Provisional Publication No. 2002-236253A (hereafter, referred to as JP2002-236253A) discloses an optical information recording/reproducing apparatus having an objective lens configured to correct a coma. However, in the optical information recording/reproducing apparatus disclosed in JP2002-236253A, change of the offence against the sine condition due to the temperature change (i.e., fluctuation of the coma) is not considered. Therefore, in the optical information recording/reproducing apparatus disclosed in JP2002-236253A, when the ambient temperature of the objective lens increases due to heat produced by internal circuits such as a driving circuit, the coma is caused, and thereby it may become impossible to form a suitable beam spot on the recording surface of the optical disc.

Incidentally, since the disc thickness of BD is smaller than those of CD and DVD, the amount of coma with respect to a certain tilt angle caused when BD is used is small. Therefore, with regard to BD, the changing rate of the coma becomes large relative to CD and DVD (In other words, with regard to BD, the effect of the change amount of coma due to temperature change is large relative to CD and DVD). For example, as the temperature becomes high, the amount of coma with respect to a certain tilt angle becomes small. In this case, in order to cancel the coma due to individual differences of optical discs with the coma caused by the tilt adjustment, it becomes necessary to tilt the objective lens by a large amount for BD. However, in order to tilt the objective lens by a large amount, it becomes necessary to place a larger amount of load on an actuator used for the tilt adjustment. If an excessively large amount of load is placed on the actuator for the tilt adjustment, the actuator may produce unusual heat.

On the other hand, as the temperature becomes low, the amount of coma with respect to a certain tilt angle becomes large. In this case, it becomes difficult to precisely control the amount of coma due to the tilt adjustment. As a result, it becomes difficult to cancel the coma caused by the individual differences of optical discs.

The present invention is advantageous in that it provides an objective lens and an optical information recording/reproducing apparatus configured to suitably correct a coma even when the temperature change occurs.

According to an aspect of the invention, there is provided an optical information recording/reproducing apparatus for recording information to and/or reproducing information from an optical disc based on a predetermined standard by using a light beam having a wavelength of $\lambda$ (unit: nm). The optical information recording/reproducing apparatus is provided with: an objective lens that converges the light beam onto a recording surface of the optical disc and satisfies a condition:

$$0.48 < \frac{d \cdot (n-1)}{f^2} < 0.75 \quad (1)$$

where f represents a focal length (unit: mm) of the objective lens with respect to the wavelength λ, d represents a thickness (unit: mm) of the objective lens along an optical axis of the objective lens, and n represents a refractive index with respect to the wavelength λ; a photoreceptor that receives the light beam reflected from the recording surface of the optical disc; a detector that detects quality of a signal outputted by the photoreceptor based on the light beam reflected from the recording surface of the optical disc, and an objective lens driving unit configured to tilt the objective lens in a direction to improve the quality of the signal based on a result of detection by the detector.

With this configuration, the fluctuation of the coma due to the temperature change can be effectively suppressed. Therefore, it becomes possible to suitably suppress the coma through tilt adjustment for the objective lens while effectively avoiding increase of the load to be placed on an actuator and decrease of the accuracy of correction for the coma.

In at least one aspect, at least one of surfaces of the objective lens may be formed to be a phase shift surface having a phase shift structure including a plurality of refractive surface zones which are concentrically formed and are divided by minute steps, and each of the steps may be formed at a boundary between adjacent ones of the plurality of annular zones to give a predetermined optical path length difference to the light beam incident thereon. In this case, when $(\Sigma \phi_{0.00-1.00})$ represents a sum of heights of all the steps formed in an effective beam diameter on the phase shift surface, and $(\Sigma \phi_{0.95-1.00})$ represents a sum of heights of the steps formed in a range of 95% to 100% of an effective beam radius with respect to the optical axis, the objective lens may satisfy a condition:

$$0.1 < \frac{\left(\sum \phi_{0.95-1.00}\right)}{\left(\sum \phi_{0.00-1.00}\right)} < 0.5. \quad (2)$$

Such a configuration makes it possible to suppress further the fluctuation of the coma due to the temperature change through the optical effect of the phase shift structure.

According to another aspect of the invention, there is provided an optical information recording/reproducing apparatus for recording information to and/or reproducing information from an optical disc based on a predetermined standard by using a light beam having a wavelength of λ (unit: nm). The optical information recording/reproducing apparatus is provided with: an objective lens that converges the light beam onto a recording surface of the optical disc and satisfies a condition:

$$0.40 < \frac{d \cdot (n-1)}{f^2} < 0.70 \quad (3)$$

where f represents a focal length (unit: mm) of the objective lens with respect to the wavelength λ, d represents a thickness (unit: mm) of the objective lens along an optical axis of the objective lens, and n represents a refractive index with respect to the wavelength λ; a photoreceptor that receives the light beam reflected from the recording surface of the optical disc; a detector that detects quality of a signal outputted by the photoreceptor based on the light beam reflected from the recording surface of the optical disc; and an objective lens driving unit configured to tilt the objective lens in a direction to improve the quality of the signal based on a result of detection by the detector.

Further, at least one of surfaces of the objective lens is formed to be a phase shift surface having a phase shift structure including a plurality of refractive surface zones which are concentrically formed and are divided by minute steps, and each of the steps is formed at a boundary between adjacent ones of the plurality of annular zones to give a predetermined optical path length difference to the light beam incident thereon. When $(\Sigma \phi_{0.00-1.00})$ represents a sum of heights of all the steps formed in an effective beam diameter on the phase shift surface, and $(\Sigma \phi_{0.95-1.00})$ represents a sum of heights of the steps formed in a range of 95% to 100% of an effective beam radius with respect to the optical axis, the objective lens satisfies a condition:

$$0.2 < \frac{\left(\sum \phi_{0.95-1.00}\right)}{\left(\sum \phi_{0.00-1.00}\right)} < 0.6. \quad (4)$$

With this configuration, the fluctuation of the coma due to the temperature change can be effectively suppressed. Therefore, it becomes possible to suitably suppress the coma through tilt adjustment for the objective lens while effectively avoiding increase of the load to be placed on an actuator and decrease of the accuracy of correction for the coma.

In at least one aspect, the objective lens may be configured such that an offence against a sine condition takes a local minimum value within a range larger than or equal to 20% and smaller than 80% of the effective beam radius with respect to the optical axis, the offence against the sine condition takes a maximum value within a range of 80% to 100% of the effective beam radius, and the maximum value of the offence against the sine condition falls within a range of 0.001 to 0.01.

In at least one aspect, the objective lens may be configured such that an offence against a sine condition and a spherical aberration become equal to each other at a 100% point of the effective beam radius when a protective layer thickness of the optical disc lies within a range of 0.105 to 0.15 (unit: mm).

According to another aspect of the invention, there is provided an objective lens for an optical information recording/reproducing apparatus for recording information to and/or reproducing information from an optical disc based on a predetermined standard, the optical disc having a protective layer thickness of 0.05 to 0.15 (unit: mm). The objective lens satisfies a condition:

$$0.48 < \frac{d \cdot (n-1)}{f^2} < 0.75 \quad (1)$$

where f represents a focal length (unit: mm) of the objective lens with respect to a light beam having a wavelength λ used for recording information to and/or reproducing information from the optical disc, d represents a thickness (unit:

mm) of the objective lens along an optical axis of the objective lens, and n represents a refractive index with respect to the wavelength λ.

With this configuration, the fluctuation of the coma due to the temperature change can be effectively suppressed. Therefore, it becomes possible to suitably suppress the coma through tilt adjustment for the objective lens while effectively avoiding increase of the load to be placed on an actuator and decrease of the accuracy of correction for the coma.

In at least one aspect, at least one of surfaces of the objective lens may be formed to be a phase shift surface having a phase shift structure including a plurality of refractive surface zones which are concentrically formed and are divided by minute steps, and each of the steps may be formed at a boundary between adjacent ones of the plurality of annular zones to give a predetermined optical path length difference to the light beam incident thereon. In this case, when $(\Sigma\phi_{0.00-1.00})$ represents a sum of heights of all the steps formed in an effective beam diameter on the phase shift surface, and $(\Sigma\phi_{0.95-1.00})$ represents a sum of heights of the steps formed in a range of 95% to 100% of an effective beam radius with respect to the optical axis, the objective lens may satisfy a condition:

$$0.1 < \frac{\left(\sum \phi_{0.95-1.00}\right)}{\left(\sum \phi_{0.00-1.00}\right)} < 0.5. \tag{2}$$

Such a configuration makes it possible to suppress further the fluctuation of the coma due to the temperature change through the optical effect of the phase shift structure.

According to another aspect of the invention, there is provided an objective lens for an optical information recording/reproducing apparatus for recording information to and/or reproducing information from an optical disc based on a predetermined standard, the optical disc having a protective layer thickness of 0.05 to 0.15 (unit: mm). The objective lens satisfies a condition:

$$0.40 < \frac{d \cdot (n-1)}{f^2} < 0.70 \tag{3}$$

where f represents a focal length (unit: mm) of the objective lens with respect to a light beam having a wavelength λ used for recording information to and/or reproducing information from the optical disc, d represents a thickness (unit: mm) of the objective lens along an optical axis of the objective lens, and n represents a refractive index with respect to the wavelength λ. At least one of surfaces of the objective lens is formed to be a phase shift surface having a phase shift structure including a plurality of refractive surface zones which are concentrically formed and are divided by minute steps, and each of the steps is formed at a boundary between adjacent ones of the plurality of annular zones to give a predetermined optical path length difference to the light beam incident thereon. When $(\Sigma\phi_{0.00-1.00})$ represents a sum of heights of all the steps formed in an effective beam diameter on the phase shift surface, and $(\Sigma\phi_{0.95-1.00})$ represents a sum of heights of the steps formed in a range of 95% to 100% of an effective beam radius with respect to the optical axis, the objective lens satisfies a condition:

$$0.2 < \frac{\left(\sum \phi_{0.95-1.00}\right)}{\left(\sum \phi_{0.00-1.00}\right)} < 0.6. \tag{4}$$

With this configuration, the fluctuation of the coma due to the temperature change can be effectively suppressed. Therefore, it becomes possible to suitably suppress the coma through tilt adjustment for the objective lens while effectively avoiding increase of the load to be placed on an actuator and decrease of the accuracy of correction for the coma.

In at least one aspect, the steps of the phase shift structure may be defined by a following optical path difference function φ(h):

$$\phi(h) = (P_2 \times h^2 + P_4 \times h^4 + P_6 \times h^6 + P_8 \times h^8 + P_{10} \times h^{10} + P_{12} \times h^{12}) m\lambda$$

where $P_2$, $P_4$, $P_6$ ... represent coefficients of the $2^{nd}$ order, $4^{th}$ order, $6^{th}$ order, h represents a height from the optical axis, and m represents a diffraction order at which diffraction efficiency is maximized.

In at least one aspect, the optical disc may have a protective layer thickness of 0.05 to 0.15 (unit: mm).

In at least one aspect, a numerical aperture NA of the objective lens defined on an optical disc side may lie within a range of 0.8 to 0.87 when the light beam having the wavelength λ is used.

In at least one aspect, the objective lens may be made of resin.

In at least one aspect, the refractive index n of the objective lens may satisfy a condition:

$$1.4 < n < 1.7 \tag{5}.$$

BRIEF DESCRIPTION OF THE ACCOMPANYING DRAWINGS

Figure 4:
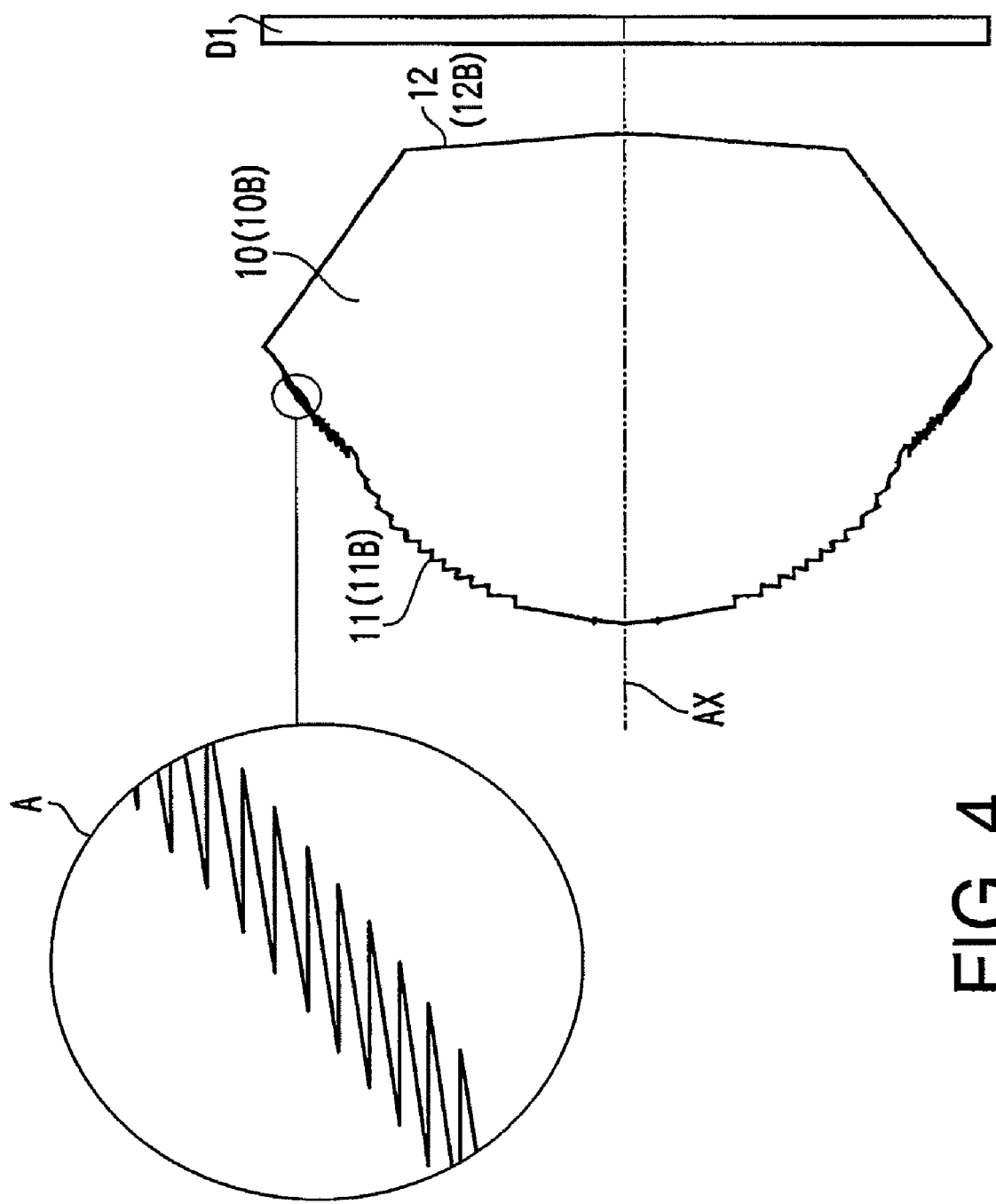

FIG. 4 schematically illustrates a configuration of the objective lens.

Figure 5A:
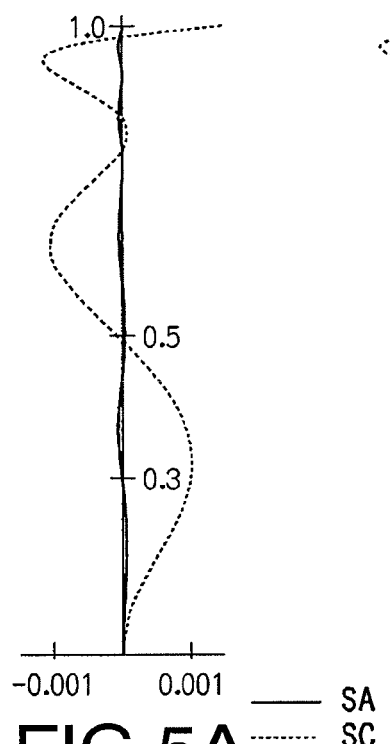
Figure 5B:
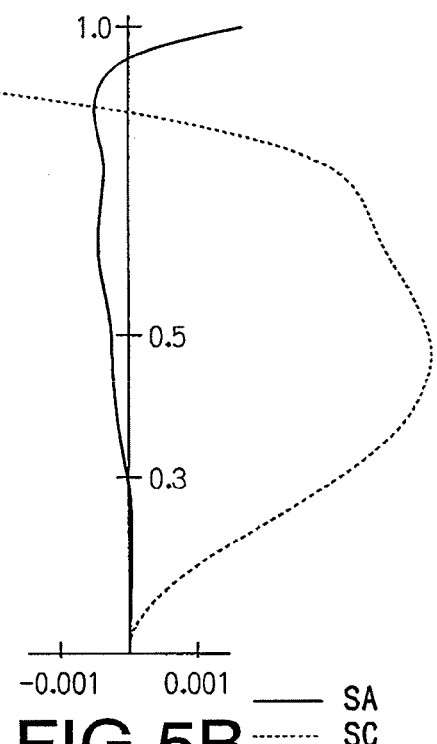

FIGS. 5A and 5B are aberration diagrams for explaining the relationship between the offence against the sine condition and the tilt sensitivity.

Figure 6A:
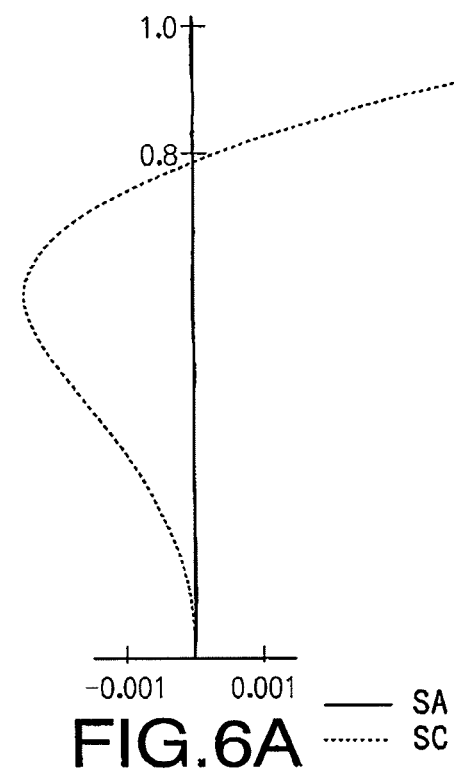
Figure 6B:
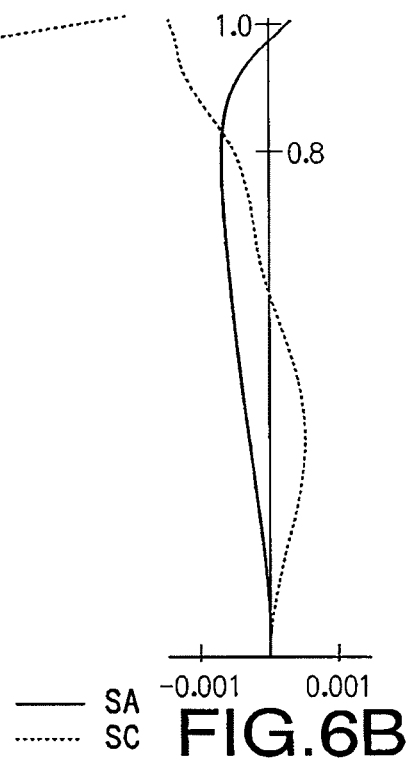

FIGS. 6A and 6B are aberration diagrams for explaining the relationship between the offence against the sine condition and the tilt sensitivity.

FIGS. 7A and 7B are aberration diagrams illustrating the spherical aberration and the offence against the since condition caused when an optical disc is used in the optical information recording/reproducing apparatus according to a first example.

FIGS. 8A and 8B are aberration diagrams illustrating the spherical aberration and the offence against the since condition caused when the optical disc is used in the optical information recording/reproducing apparatus according to a second example.

Figure 9A:
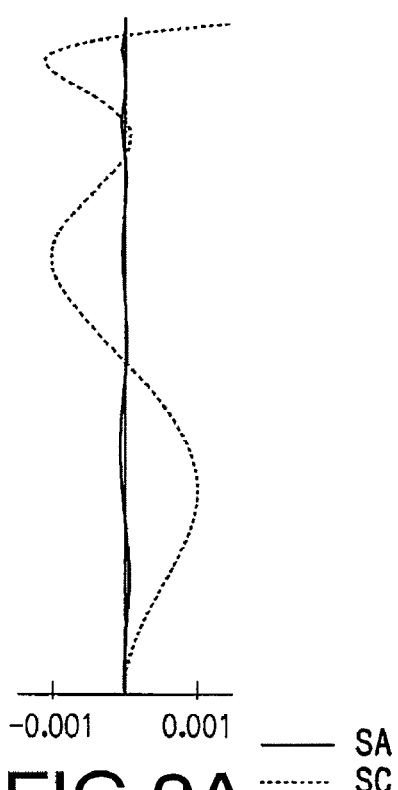
Figure 9B:
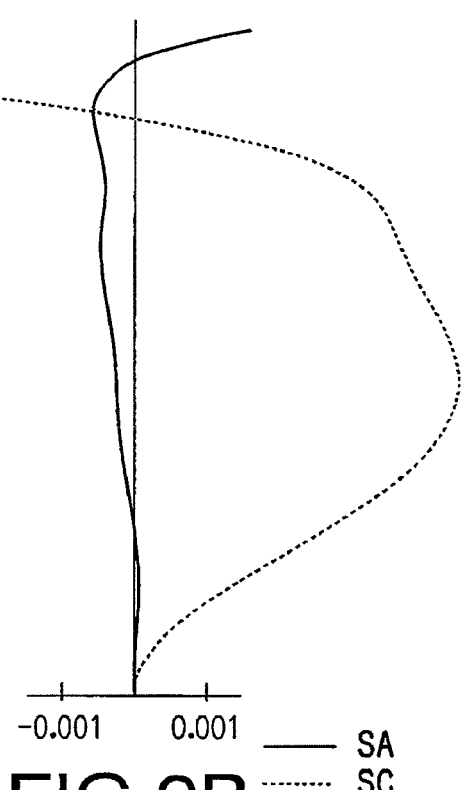

FIGS. 9A and 9B are aberration diagrams illustrating the spherical aberration and the offence against the since condition caused when the optical disc is used in the optical information recording/reproducing apparatus according to a third example.

Figure 10A:
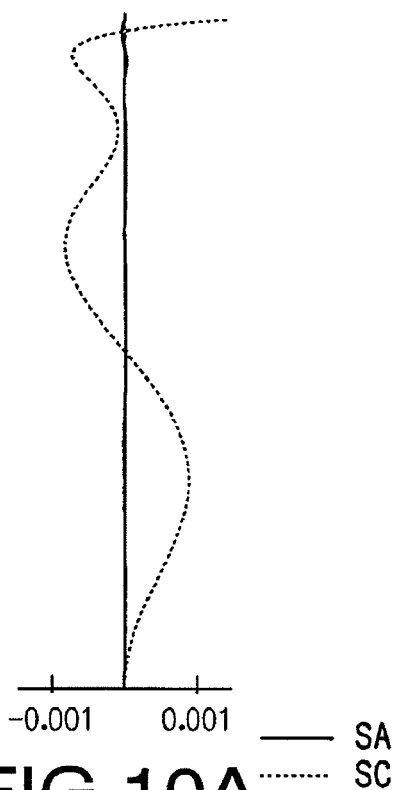
Figure 10B:
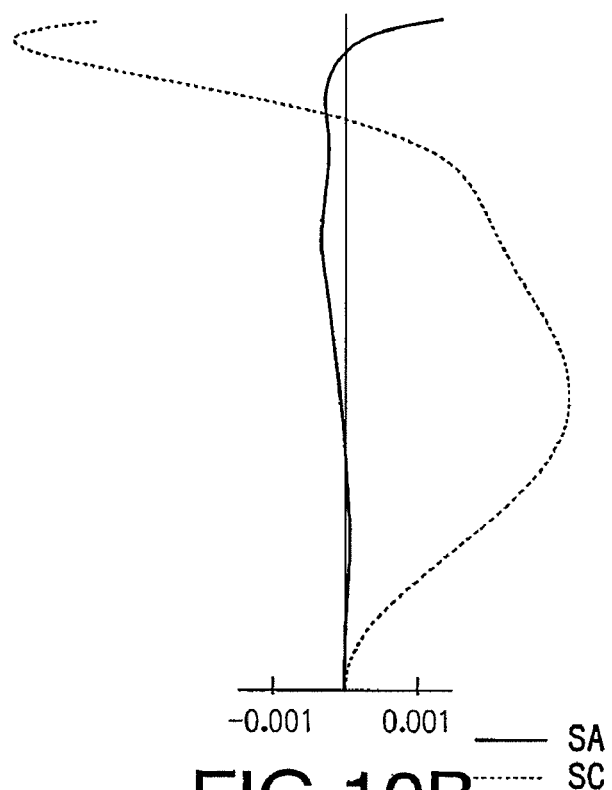

FIGS. 10A and 10B are aberration diagrams illustrating the spherical aberration and the offence against the since condition caused when the optical disc is used in the optical information recording/reproducing apparatus according to a fourth example.

Figure 11A:
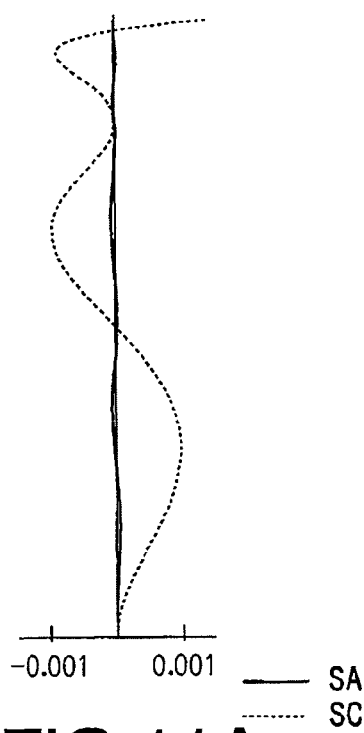
Figure 11B:
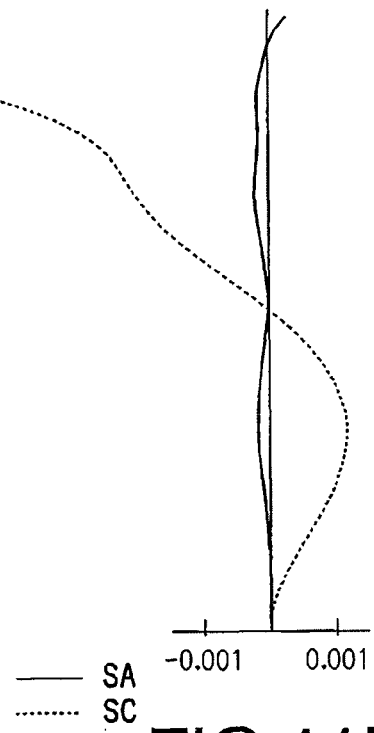

FIGS. 11A and 11B are aberration diagrams illustrating the spherical aberration and the offence against the since condition caused when the optical disc is used in the optical information recording/reproducing apparatus according to a fifth example.

Figure 12A:
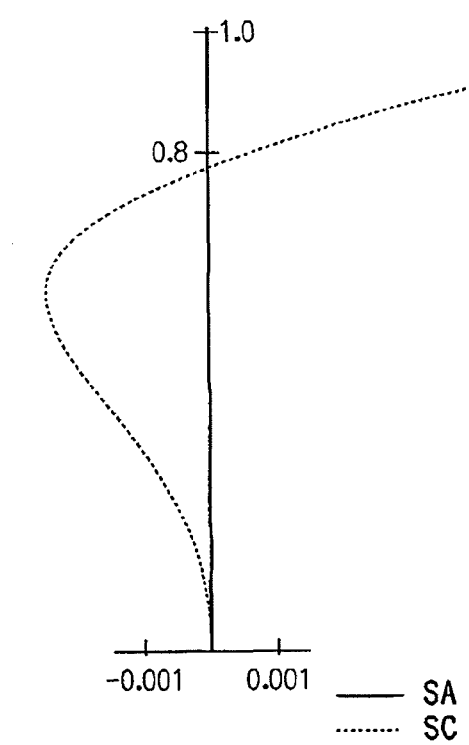
Figure 12B:
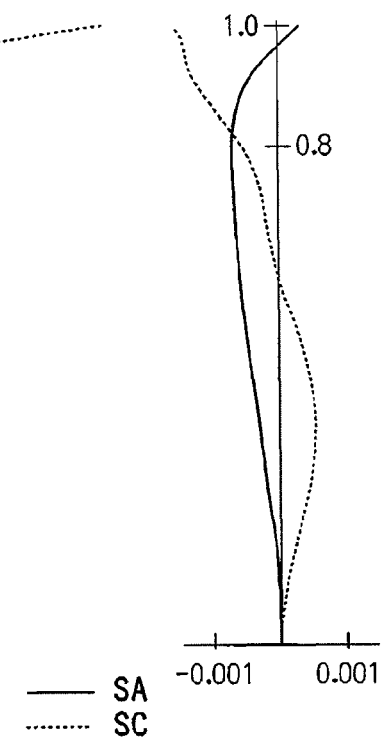

FIGS. 12A and 12B are aberration diagrams illustrating the spherical aberration and the offence against the since condition caused when the optical disc is used in the optical information recording/reproducing apparatus according to a sixth example.

Figure 13A:
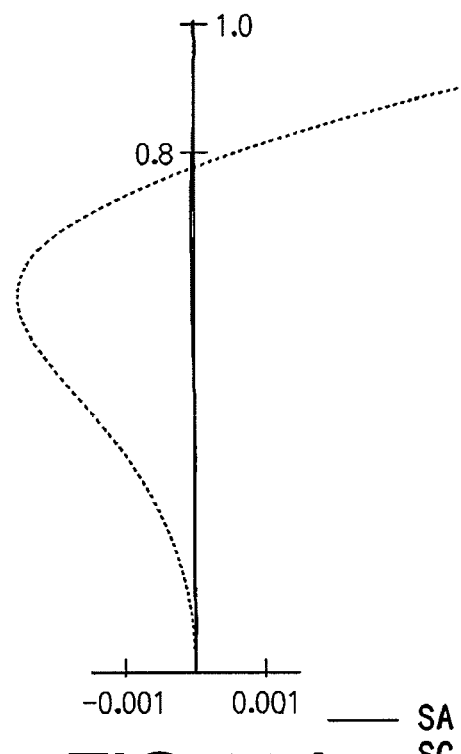
Figure 13B:
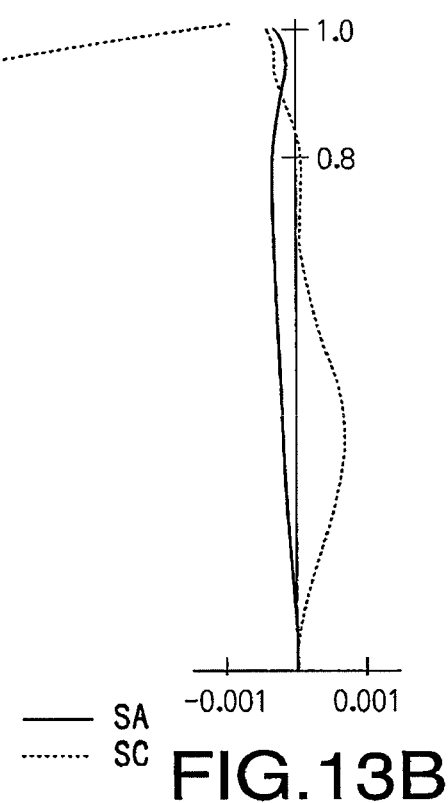

FIGS. 13A and 13B are aberration diagrams illustrating the spherical aberration and the offence against the since condition caused when the optical disc is used in the optical information recording/reproducing apparatus according to a seventh example.

Figure 14A:
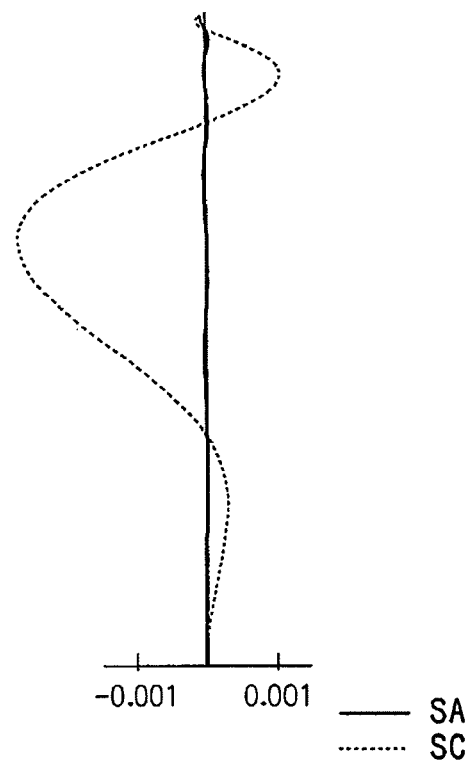
Figure 14B:
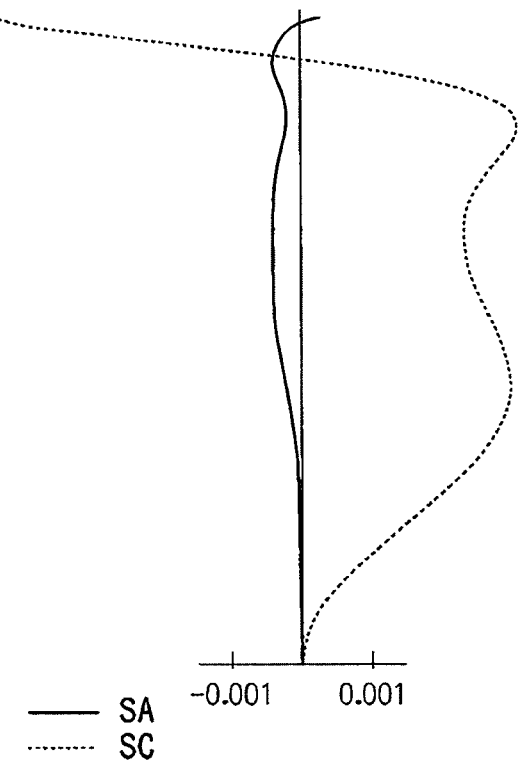

FIGS. 14A and 14B are aberration diagrams illustrating the spherical aberration and the offence against the since condition caused when the optical disc is used in the optical information recording/reproducing apparatus according to an eighth example.

Figure 15A:
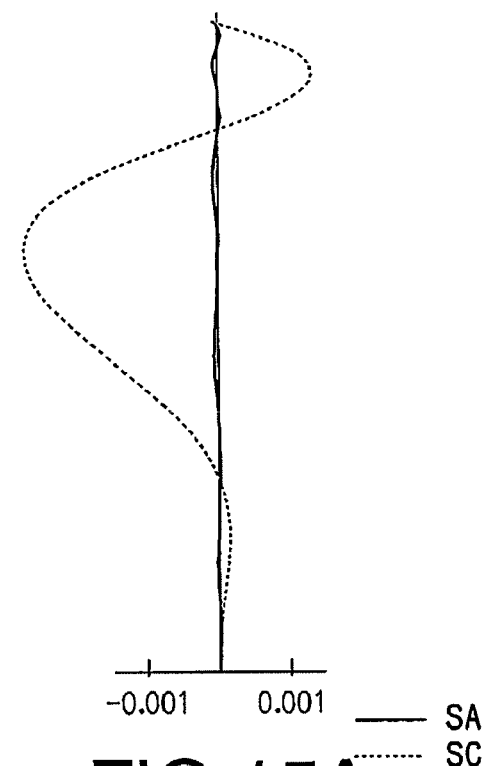
Figure 15B:
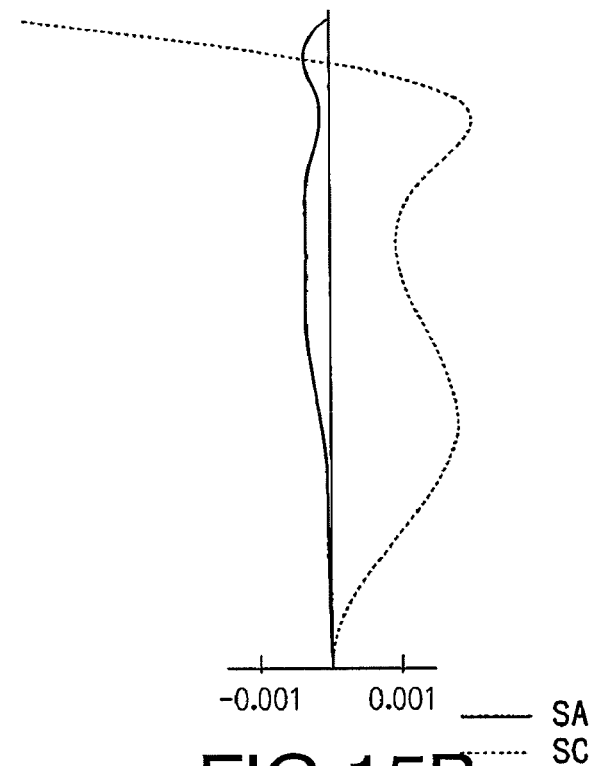

FIGS. 15A and 15B are aberration diagrams illustrating the spherical aberration and the offence against the since condition caused when the optical disc is used in the optical information recording/reproducing apparatus according to a ninth example.

Figure 16A:
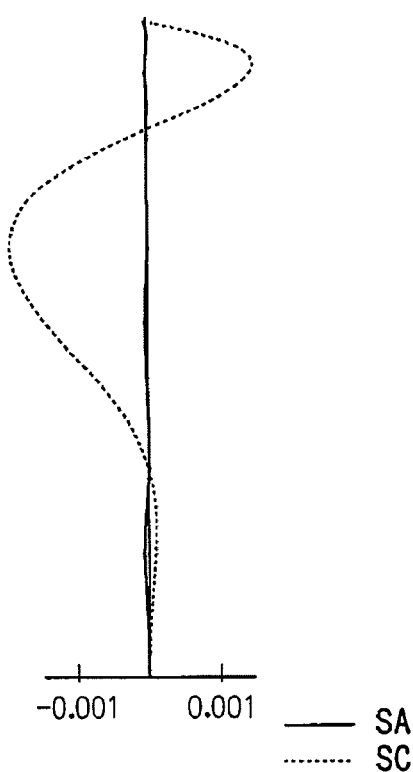
Figure 16B:
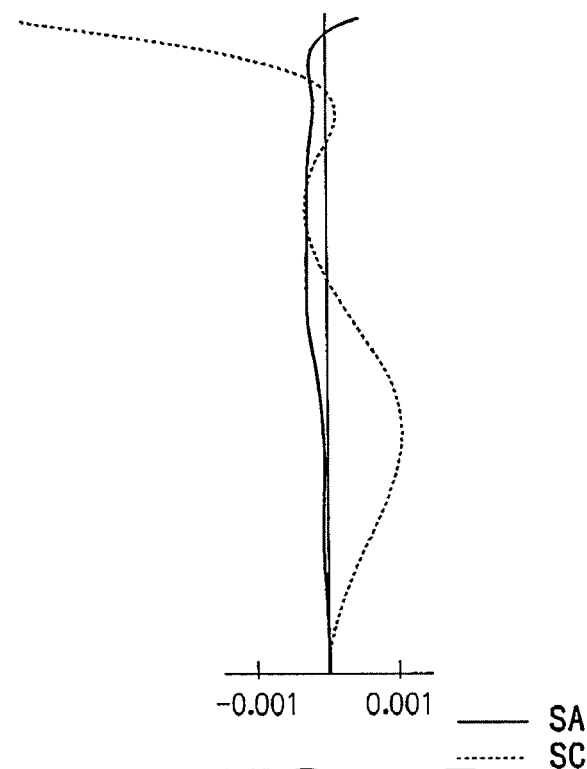

FIGS. 16A and 16B are aberration diagrams illustrating the spherical aberration and the offence against the since condition caused when the optical disc is used in the optical information recording/reproducing apparatus according to a tenth example.

Figure 17A:
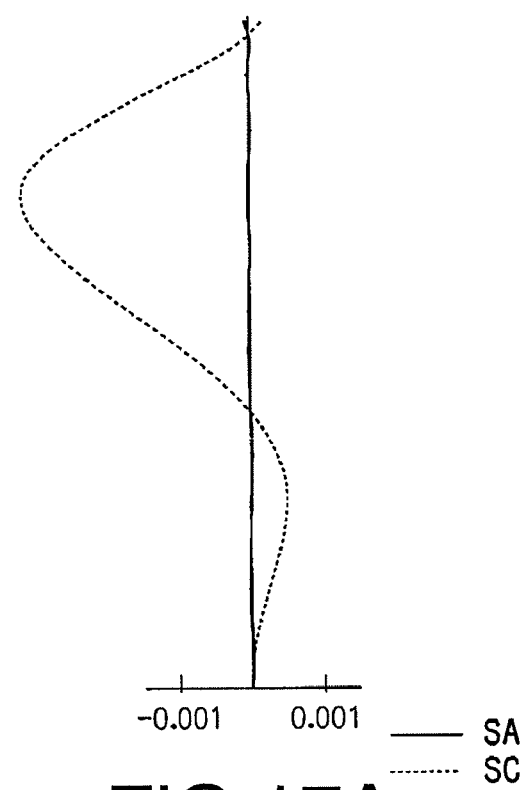
Figure 17B:
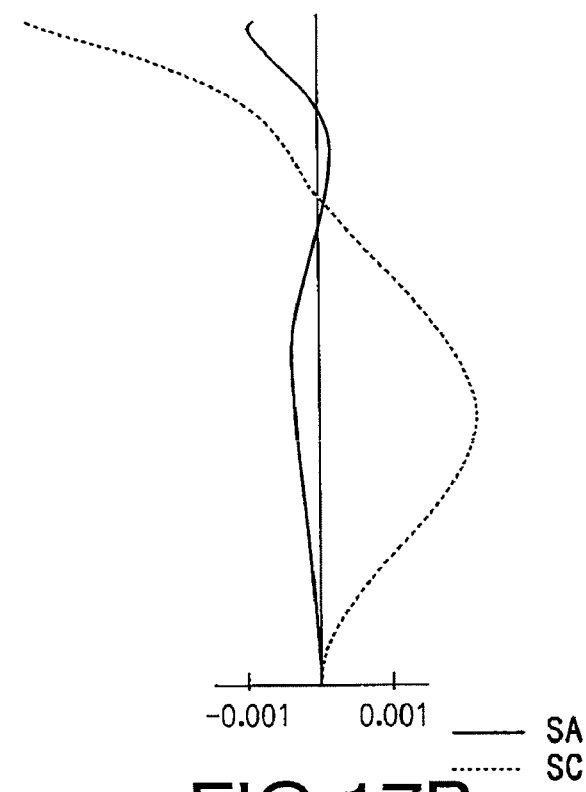

FIGS. 17A and 17B are aberration diagrams illustrating the spherical aberration and the offence against the since condition caused when the optical disc is used in the optical information recording/reproducing apparatus according to an eleventh example.

Figure 18A:
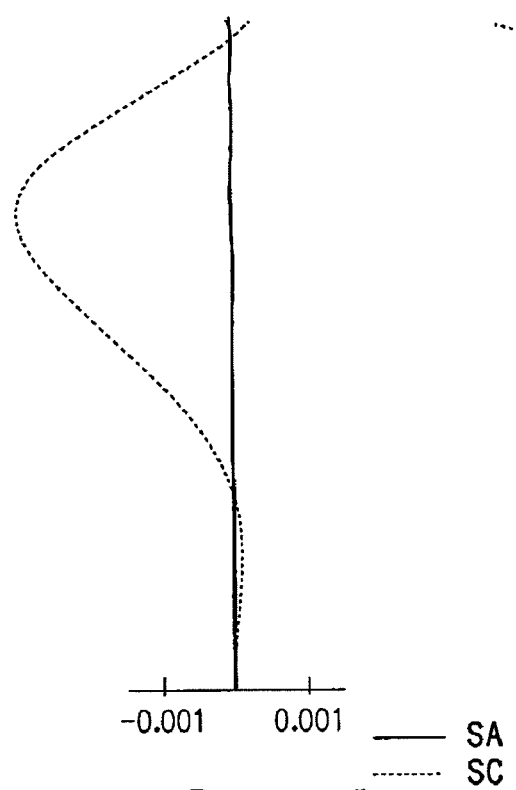
Figure 18B:
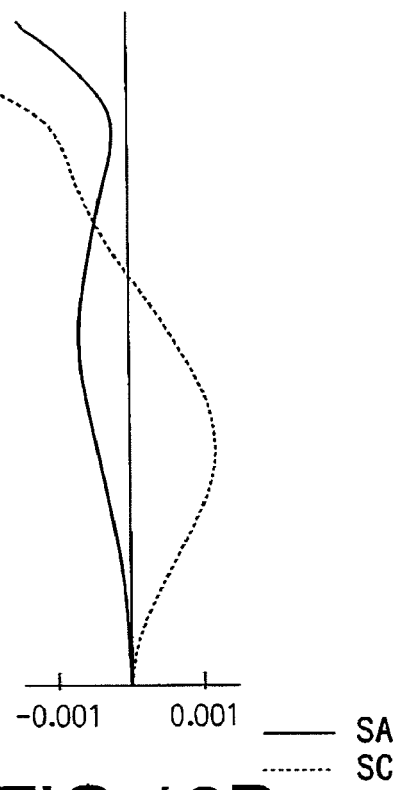

FIGS. 18A and 18B are aberration diagrams illustrating the spherical aberration and the offence against the since condition caused when the optical disc is used in the optical information recording/reproducing apparatus according to a twelfth example.

Figure 19A:
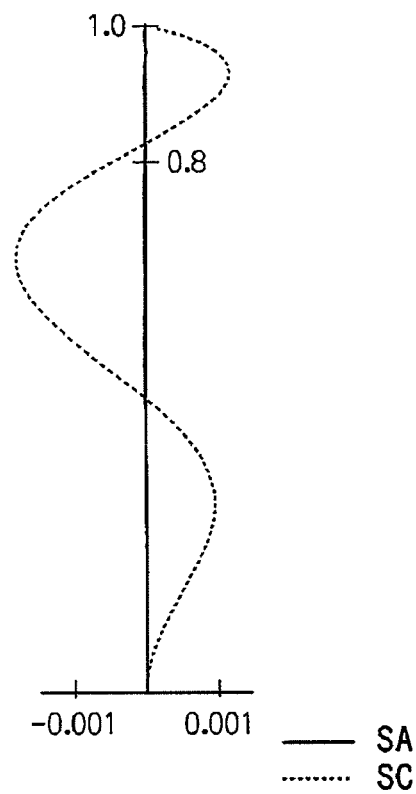
Figure 19B:
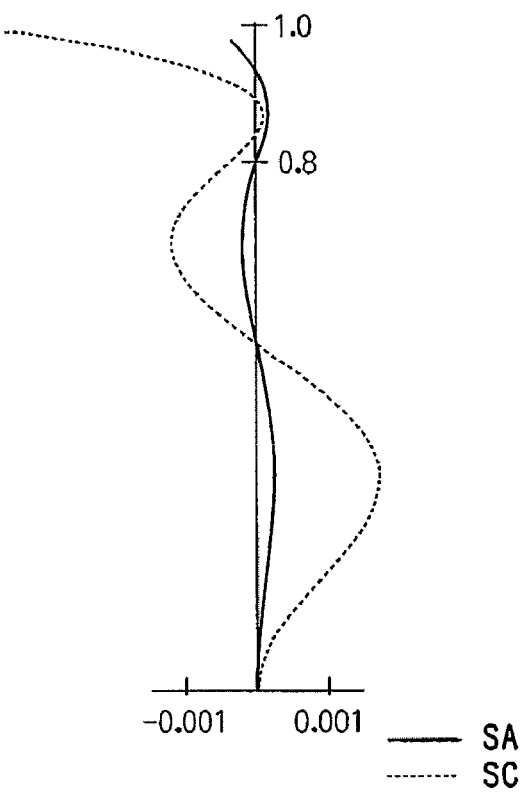

FIGS. 19A and 19B are aberration diagrams illustrating the spherical aberration and the offence against the since condition caused when the optical disc is used in the optical information recording/reproducing apparatus according to a thirteenth example.

Figure 20:
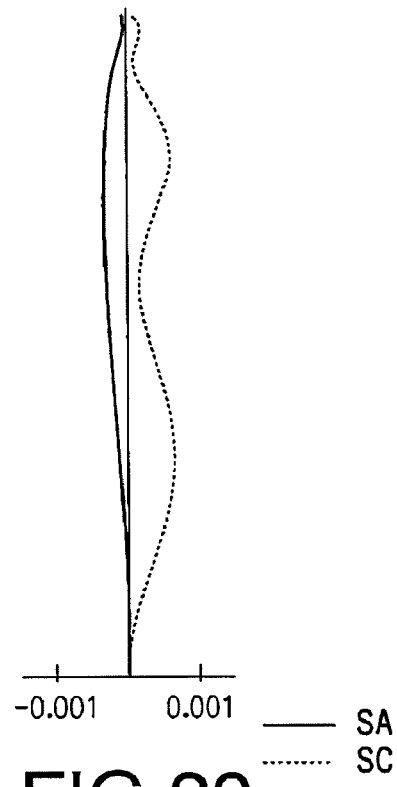

FIG. 20 is an aberration diagram illustrating the spherical aberration and the offence against the sine condition caused when an optical disc having a relatively large protective layer thickness is used.

Figure 21A:
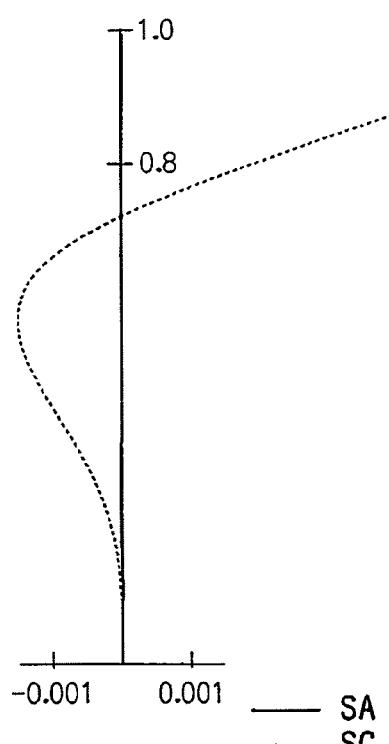
Figure 21B:
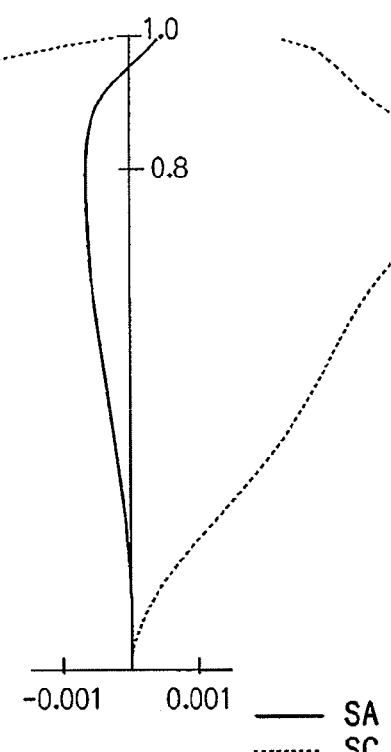

FIGS. 21A and 21B are aberration diagrams illustrating the spherical aberration and the offence against the since condition caused when the optical disc is used in the optical information recording/reproducing apparatus according to a fourteenth example.

Figure 22A:
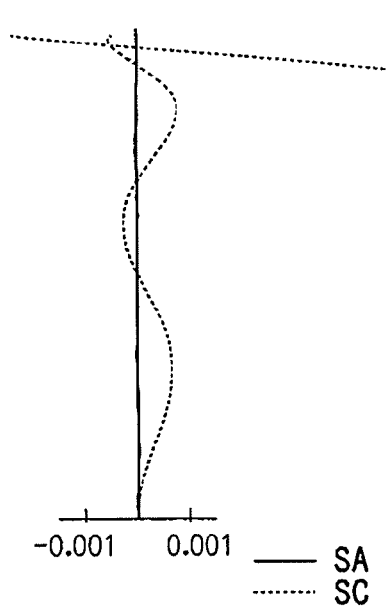
Figure 22B:
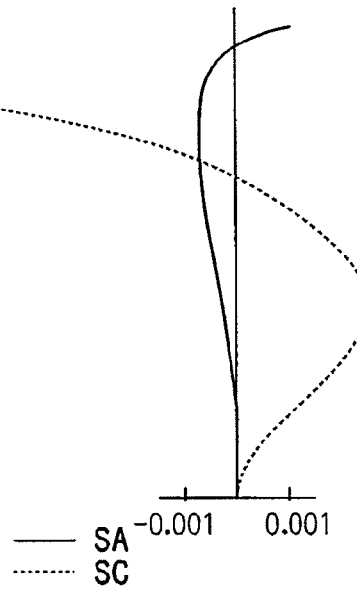

FIGS. 22A and 22B are aberration diagrams illustrating the spherical aberration and the offence against the since condition caused when the optical disc is used in the optical information recording/reproducing apparatus according to a comparative example.

Figure 23:
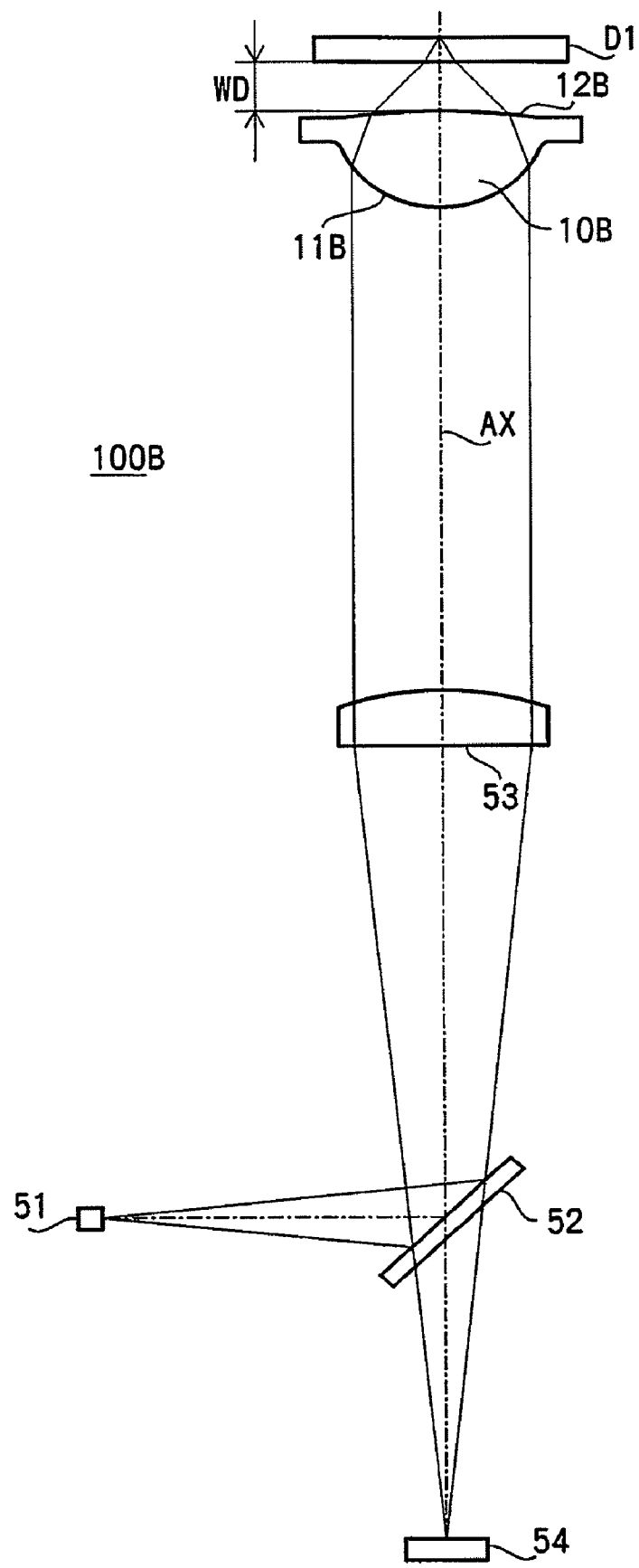

FIG. 23 is a block diagram of an optical information recording/reproducing apparatus having an objective lens according to a second embodiment.

Figure 24:
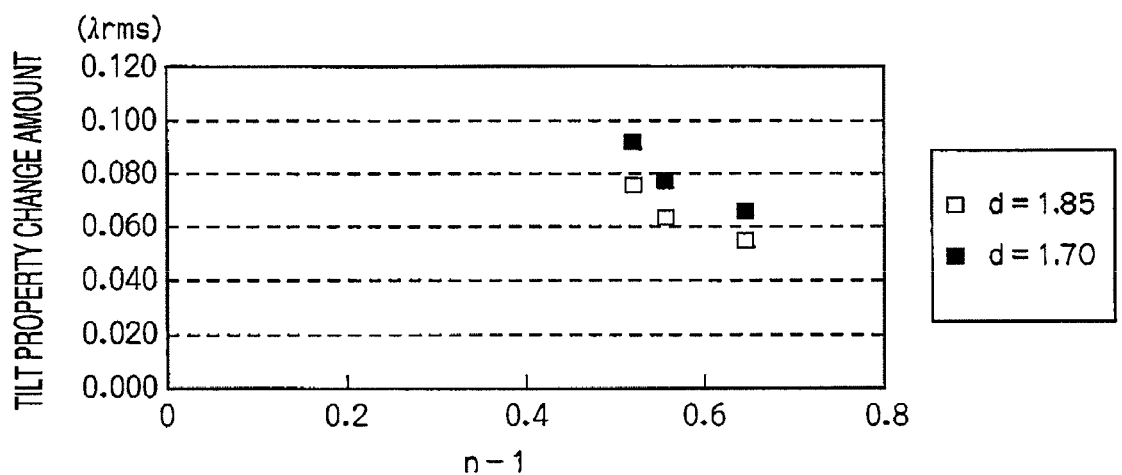

FIG. 24 is a graph illustrating the relationship between the thickness of the objective lens on the optical axis, the refractive index and a tilt property change amount.

Figure 25:
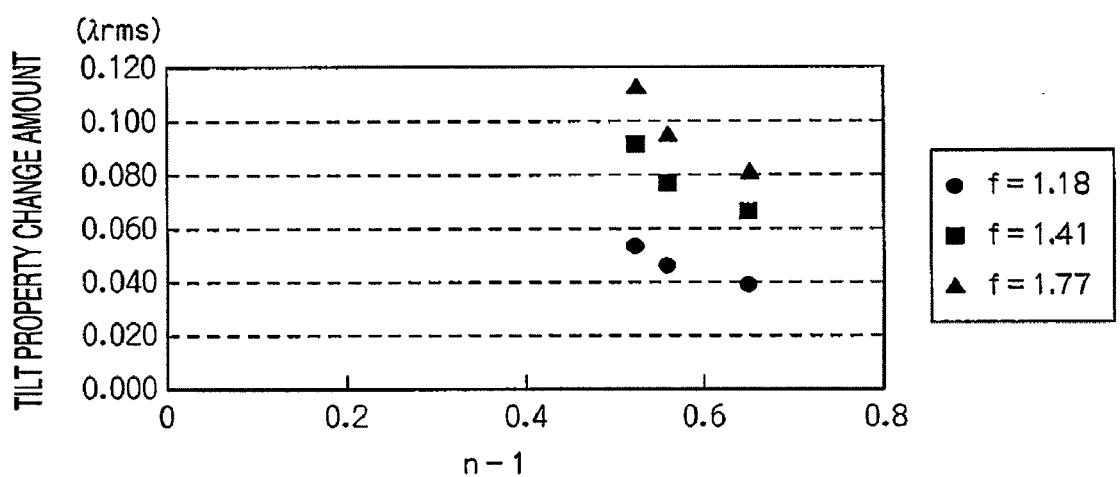

FIG. 25 is a graph illustrating the relationship between the focal length of the objective lens, the refractive index and the tilt property change amount.

DETAILED DESCRIPTION OF THE EMBODIMENTS

Hereinafter, embodiments according to the invention are described with reference to the accompanying drawings.

First Embodiment

Figure 1:
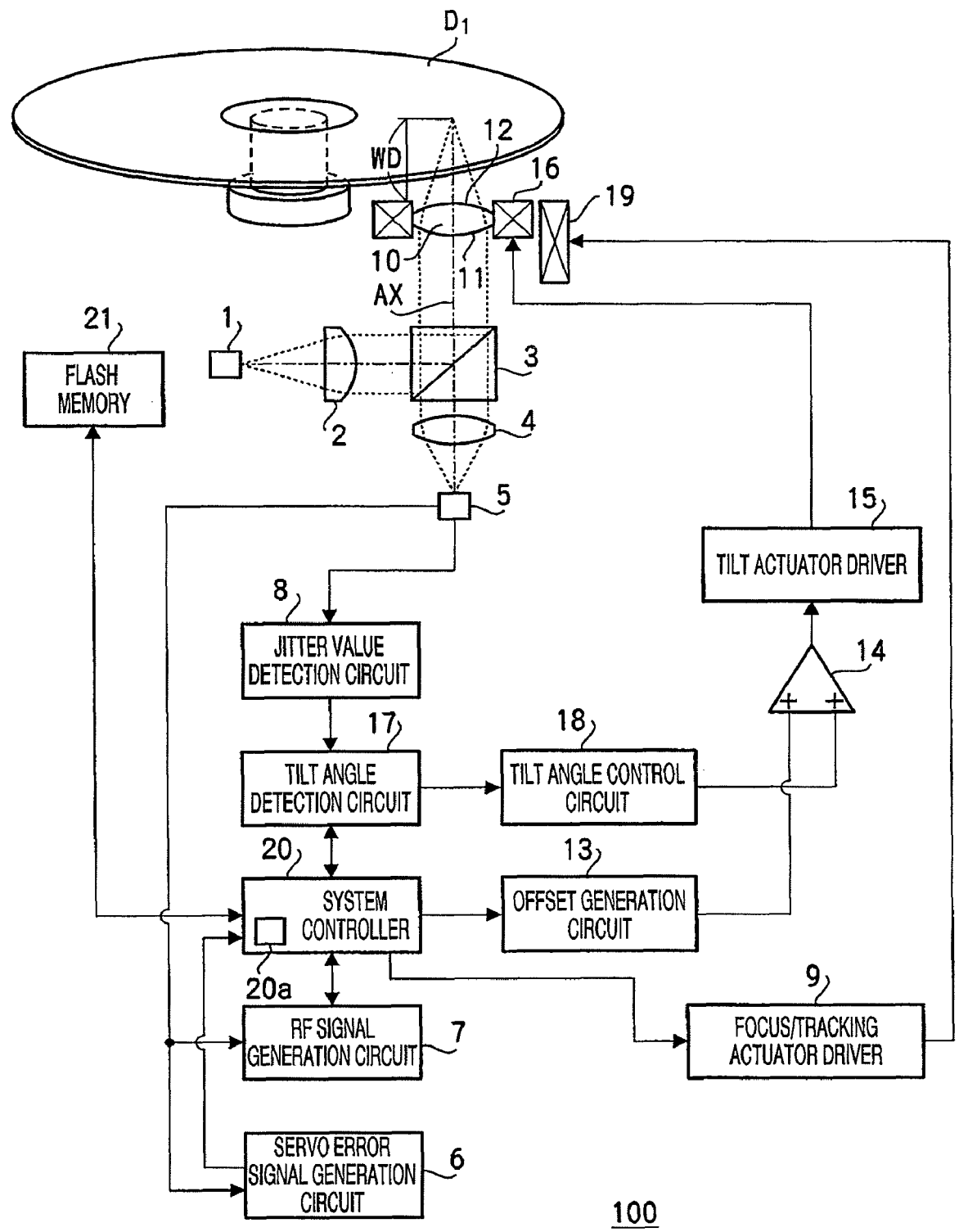
FIG. 1 is a block diagram of an optical information recording/reproducing apparatus having an objective lens according to a first embodiment of the invention.

FIG. 1 is a block diagram of an optical information recording/reproducing apparatus 100 having an objective lens 10 according to a first embodiment of the invention. The optical information recording/reproducing apparatus 100 is configured to execute information recording/reproducing for a high recording density optical disc based on a predetermined standard (e.g., BD). In the following, the high recording density optical disc is represented as an optical disc D1.

As shown in FIG. 1, the optical information recording/reproducing apparatus 100 includes a system controller 20 which performs total control of the optical information recording/reproducing apparatus 100. When the optical information recording/reproducing apparatus 100 is turned on, the system controller 20 starts accessing internal hardware units via a system bus (not shown). For example, when the optical information recording/reproducing apparatus 100 is turned on, the system controller 20 accesses a flash memory 21 to read firmware and to load the firmware onto, for example, a work area of a memory embedded therein. Then, in accordance with the firmware, the system controller 20 starts control such as timing control for each of the hardware units.

For example, when an optical disc D1 is inserted into a slot (not shown) of the optical information recording/reproducing apparatus 100, the system controller 20 controls a light source 1 to read TOC (Table Of Contents) written into a read-in area of the optical disc D1.

As shown in FIG. 1, the optical information recording/reproducing apparatus 100 includes the light source 1, a collimator 2, a beam splitter cube 3, an objective lens 10, a condenser lens 4 and a photoreceptor 5.

The light source 1 includes a semiconductor laser which emits blue laser light having a design wavelength of 406 nm, and a driver circuit which drives the semiconductor laser. In consideration of the use environment and individual differences of light sources, the wavelength λ of the laser light fluctuates within a range of several nanometers through several tens of nanometers.

As shown in FIG. 1, a laser beam emitted from the semiconductor laser of the light source 1 enters the collimator 2, and is converted into a collimated beam by the collimator 2. The collimated beam is then deflected by the beam splitter cube 3 to be incident on a first surface 11 of the objective lens 10. The laser beam which has entered the objective lens 10 exits from a second surface 12 of the objective lens 10. The laser beam is converged by the objective lens 10 onto a recording surface of the optical disc D1 for which the information recording/reproducing is performed.

Then, the laser beam is reflected from the optical disc D1, and returns along the same optical path for the laser beam proceeding toward the optical disc D1. Then, the retuning laser beam is incident on the condenser lens 4 after passing through the beam splitter cube 3. The laser beam passed through the condenser lens 4 is then received by the photoreceptor 5. In FIG. 1, a chain line indicates a reference axis AX of optical components of the optical information recording/reproducing apparatus 100. In FIG. 1, each of the laser beam proceeding toward the optical disc D1 and the returning laser beam is indicated by a dashed line. It should be noted that in another embodiment a common lens serving as both of the collimator 2 and the condenser lens 4 may be employed.

The optical disc D1 has a protective layer and the recording surface (not shown). Practically, the recording surface is sandwiched between the protective layer and a substrate layer or a label layer. When information recording/reproducing (i.e., information recording and/or information reproducing) is performed, the optical disc D1 is placed on a turn table (not shown). For example, the optical disc D1 has the thickness of 0.05 to 0.15 mm.

The photoreceptor 5 executes photoelectric conversion with respect to received light to generate analog signals, and outputs the analog signals to a servo error signal generation circuit 6, an RF signal generation circuit 7, a jitter value detection circuit 8.

The servo error signal generation circuit 6 generates a focus error signal and a tracking error signal based on the analog signal inputted from the photoreceptor 5, and outputs the focus error signal and the tracking error signal to the system controller 20. The system controller 20 generates a focus drive signal and a tracking drive signal based on the focus error signal and the tracking error signal inputted from the servo signal generation circuit 6, and outputs the focus drive signal and the tracking drive signal to a focus/tracking actuator driver 9. The focus/tracking actuator driver 9 controls driving in a focusing direction and a tracking direction by a two-axis actuator 19 based on the inputted focus drive signal ad the tracking drive signal. By this control for the two-axis actuator 19, the objective lens 10 is moved in the focusing direction or the tracking direction, and the focus error and the tracking error are corrected. As a result, the laser beam emerging from the second surface 12 of the objective lens 10 is converged in the vicinity of the recording surface of the optical disc D1.

By correcting the focus error and the tracking error, the information reproducing from the optical disc D1 can be realized. The RF signal generation circuit 7 converts the analog signal into a bit stream and executes an error correction process. Then, the RF signal generation circuit 7 decodes the bit stream for which the error correction process has been performed to obtain an RF signal, and outputs the RF signal to the system controller 20. Thus, TOC written into the read-in area of the optical disc D1 is decoded and is outputted to the system controller 20.

Based on the inputted TOC, the system controller 20 judges the type of the optical disc D1. The types of the optical discs D1 include a single layer single side BD and a dual layer single sided BD. The system controller 20 accesses the flash memory 21 to read tilt angle control information corresponding to the type of the optical disc judged by the system controller 20. The tilt angle control information is, for example, information indicating a tilt angle of the objective lens 10 at which the coma is suitably corrected under the design reference temperature (e.g., 35° C.). The tilt angle control information has been defined in advance for each of the types of the optical disc D1, and has been stored in the flash memory 21.

The system controller 20 holds the tilt angle control information read from the flash memory 21 in a cache memory 20a and outputs the information to an offset generating circuit 13. The offset generating circuit 13 generates a tilt driving signal based on the inputted tilt angle control information, and outputs the tilt driving signal to an adder 14. At this time, only the tilt driving signal from the offset generating circuit 13 is inputted to the adder 14. Therefore, the adder 14 outputs a signal equal to the tilt driving signal from the offset generating circuit 13 to a tilt actuator driver 15. The tilt actuator driver 15 controls and drives a tilt actuator 16 based on the tilt driving signal from the adder 14. Under the above described control by the tilt actuator 16, the objective lens 10 is tilted at a tilt angle (hereafter, referred to as a "reference tilt angle") at which the coma is suitably corrected under the design reference temperature (35° C.).

However, the larger the difference between the ambient temperature and the design reference temperature (35° C.) becomes or the larger the individual differences of the optical disc D1 becomes, the larger the amount of the remaining coma which remains when the objective lens 10 is tilted only by the tilt adjustment to have the reference tilt angle corresponding to the type of the optical disc D1 becomes. In this case, it becomes impossible to form a suitable beam spot on the recording surface of the optical disc D1. For this reason, the system controller 20 outputs a predetermined pulse signal to a tilt angle calculation circuit 17 to enhance the signal quality, for example, in accordance with the temperature change.

With the temperature change, the analog signal inputted to the jitter value detection circuit 8 varies. More specifically, a high frequency component of the analog signal inputted to the jitter value detection circuit 8 varies. The jitter value detection circuit 8 extracts a high frequency component of the analog signal, and executes the A-D conversion for the high frequency component to detect a jitter value. Then, the jitter value detection circuit 8 outputs the detected jitter value to the system controller 20. The system controller 20 calculates change of the inputted jitter value by a closed loop control, and outputs, to a tilt angle control circuit 18, a predetermined pulse signal determined to tilt the objective lens 10 to improve the jitter value.

Based on the inputted pulse signal, the tilt angle control circuit 18 generates a tilt driving signal for tilting the objected lens 10 to have a direction for enhancing the jitter value, and outputs the tilt driving signal to the adder 14. The adder 14 outputs, to the tilt actuator driver 15, the tilt driving signal in which both of the reference tilt angle and the predetermined tilt angle generated by the tilt angle control circuit 18 are reflected. Therefore, under the drive control of the tilt actuator driver 15, the tilt actuator 16 is able to tilt the objective lens 10 so that the objective lens 10 has the direction where the amount of coma is decreased constantly.

The tilting direction of the objective lens 10 may be controlled in accordance with the width of the RF signal, a bit error rate and a coma detected by a coma detecting unit. In other words, the quality of a signal based on the returning laser beam is indicated by one ore more of the jitter value, the width of the RF signal, a bit error rate and a coma.

As described above, in an conventional optical information recording/reproducing apparatus, an excessive load is placed on an actuator when an objective lens is tilted under the high temperature because the tilting amount the objective lens becomes larger as the ambient temperature increases, and, under the low temperature condition, it becomes more difficult to precisely control the amount of coma by the tilt adjustment as the ambient temperature decreases. For this reason, according to the embodiment, the objective lens 10 is configured to effectively suppress the fluctuation of the coma with respect to a certain tilt angle due to the temperature change so that the tilt angle of the actuator is decreased to avoid the excessive load from acting on the actuator under the high ambient temperature condition and that the precise control for the amount of coma by the tilt adjustment is secured under the low ambient temperature condition.

For information recording/reproducing for the optical disc D1, the objective lens 10 is configured such that the numerical aperture NA falls within, for example, a range of 0.8 to 0.87 at the use wavelength of $\lambda$.

The objective lens 10 is a resin lens made of synthetic resin, and therefore is light in weight relative to a glass lens. Therefore, the load to be placed on the tilt actuator 16 and the two-axis actuator 19 can be decreased in comparison with the case where the objective lens 10 is made of glass. It is understood that using resin as material of the objective lens 10 is advantageous in regard to various aspects including the easiness of manufacturing, productivity and cost as well as the reduction in weight.

As material of the objective lens 10, resin having the refractive index n falling within the range of 1.4 to 1.7 with respect to the wavelength $\lambda$ is used, for example. It should be noted that a resin lens shows remarkable fluctuation in the amount of coma with respect to a certain tilt angle due to the temperature change in comparison with a glass lens. In this embodiment, the objective lens 10 is configured to effectively suppress the fluctuation in the amount of coma with respect to a certain tilt angle due to the temperature change regardless of the fact that the objective lens 10 is made of resin.

Each of the first and second surfaces 11 and 12 of the objective lens 10 is formed to be an aspherical surface. A shape of an aspherical surface is expressed by a following equation:

$$X(h) = \frac{ch^2}{1+\sqrt{1-(1+K)c^2h^2}} + \sum_{i=2} A_{2i}h^{2i}$$

where, X(h) represents a SAG amount which is a distance between a point on the aspherical surface at a height of h from the optical axis and a plane tangential to the aspherical surface at the optical axis, symbol c represents curvature on the optical axis (i.e., 1/r when r represents a curvature radius (unit: mm)), K is a conical coefficient, and $A_{2i}$ (i: an integer larger than or equal to 2) represents an aspherical coefficient of an even order larger than or equal to the fourth order. By forming each of the first and second surfaces 11 and 12 of the objective lens to be an aspherical surface, it becomes possible to appropriately control the various aberrations including the spherical aberration and the coma.

According to the embodiment, two types of examples of the objective lens 10 are provided. The first type of the objective lens 10 is configured such that both of the first and second surfaces 11 and 12 are formed to be aspherical surfaces. The second type of the objective lens 10 is configured such that both of the first and second surfaces 11 and 12 are formed to be aspherical surfaces and an annular zone structure is formed on one of the first and second surfaces 11 and 12. In the following, when it is necessary to explain the first type and the second type of the objective lens 10 separately, the first type is referred to as "an objective lens not having an annular zone structure" and the second type is referred to as "an objective lens having an annular zone structure".

The annular zone structure includes a plurality of refractive surface zones (annular zones) concentrically formed about the optical axis of the objective lens 10. The plurality of annular zones are divided by minute steps which are formed at boundaries between adjacent ones of the plurality of annular zones and which extend in parallel with the optical axis.

In general, the annular zone structure is formed on the first surface 11 of the objective lens 10. When the annular zone structure is formed on the first surface 11 of the objective lens 10, it becomes possible to form the annular zone structure such that the minimum annular zone width becomes relatively large. As a result, the advantage that the loss of light by each step between the adjacent annular zones can be suppressed can be achieved.

Furthermore, since the first surface 11 on which the annular zone structure is formed does not face the optical disc D1. Such a configuration achieves the advantages that debris does not adhere to the first surface 11 and the annular zones do not wear when the objective lens 10 is wiped with a lens cleaner.

Each step is designed such that a predetermined optical path length difference is caused between a laser beam passing through the inside of a boundary and a laser beam passing through the outside of the boundary. It is noted that such an annular zone structure may be called a diffraction structure.

If the annular zone structure is designed such that the predetermined optical path length difference is a n-fold value (n: integer) of a particular wavelength $\alpha$, the annular zone structure may be expressed as an n-th order diffraction structure having a blazed wavelength $\alpha$. If a laser beam having a particular wavelength $\beta$ passes through the diffraction structure, the diffraction order having the highest diffraction efficiency is equal to an integer "m" closest to a value obtained by dividing the optical path length difference given to the beam of the wavelength $\beta$ with the wavelength $\beta$.

Considering the fact that an optical path length difference is caused between the laser beam passing through the inside of a boundary and the laser beam passing through the outside of the boundary, the effect of the annular zone structure may be expressed in such a manner that the phase of the laser beam passing through the inside of the boundary and the phase of the laser beam passing through the outside of the boundary shift with respect to each other by the effect of the step. Therefore, the annular zone structure may be called a structure for shifting the phase of an incident light beam (i.e., a phase shift structure).

If the annular zone structure is considered as the diffraction structure, the annular zone structure can be expressed by a following optical path difference function $\phi(h)$:

$$\phi(h)=(P_2\times h^2+P_4\times h^4+P_6\times h^6+P_8\times h^8+P_{10}\times h^{10}+P_{12}\times h^{12})m\lambda$$

where $P_2$, $P_4$, $P_6$ ... represent coefficients of the $2^{nd}$ order, $4^{th}$ order, $6^{th}$ order ..., h represents a height from the optical axis, m represents a diffraction order at which the diffraction efficiency is maximized, and $\lambda$ represents a design wavelength of a laser beam being used.

Figure 2:
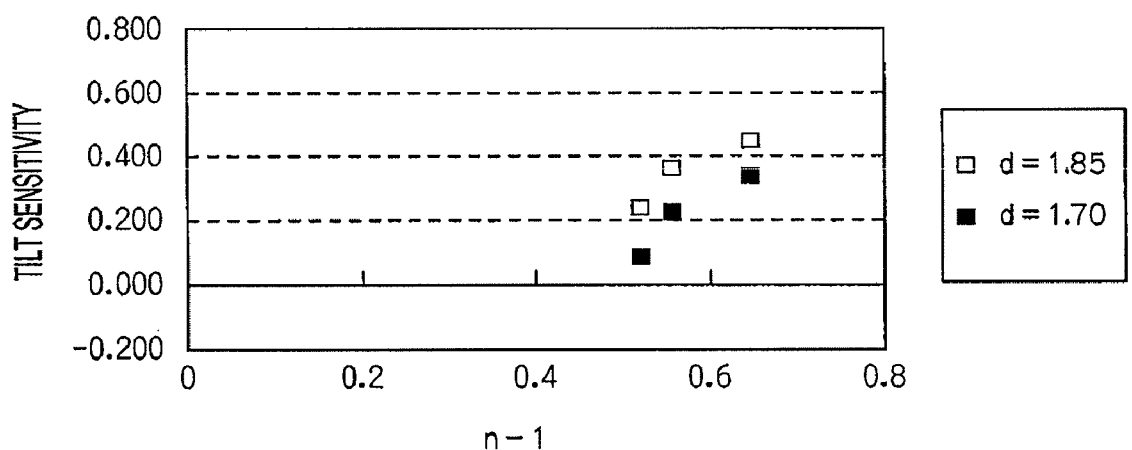
FIG. 2 is a graph illustrating the relationship between the thickness of the objective lens on the optical axis, the refractive index and the tilt sensitivity.
Figure 3:
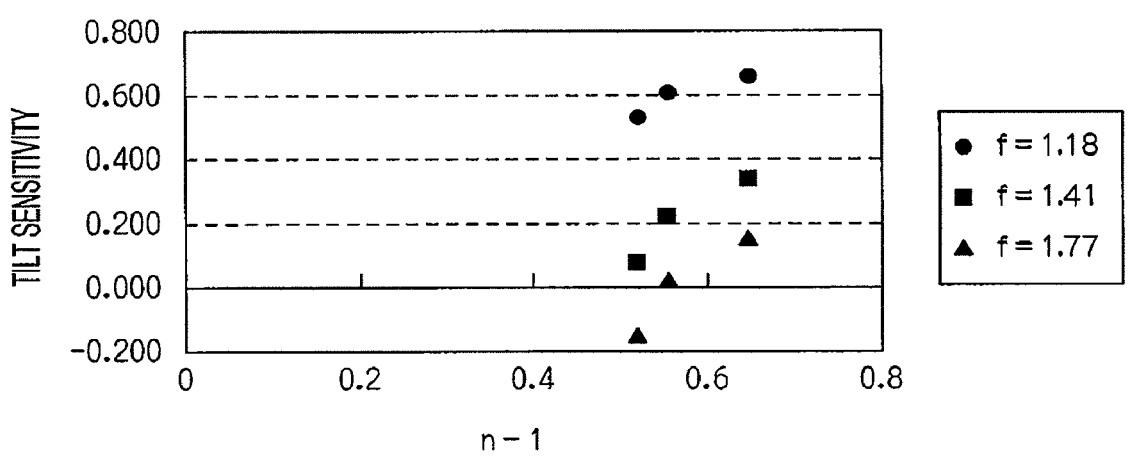
FIG. 3 is a graph illustrating the relationship between the focal length of the objective lens, the refractive index and the tilt sensitivity.

The inventors of the present invention have found relationships shown in FIGS. 2 and 3 where a value obtaining by dividing a value of the third order coma caused when the objective lens is tilted by 1.0 degree under the high temperature condition of 80° C. by a value of the third order coma caused when the objective lens is tilted by 1.0 degree under the design reference temperature condition of 35° C. is defined as tilt sensitivity. That is, the tilt sensitivity represents a ratio between the amounts of coma caused, with respect to a certain tilt angle, when temperature change occurs. In each of FIGS. 2 and 3, the vertical axis represents the tilt sensitivity, and the horizontal axis represents the value (hereafter, referred to as "refractive index n−1") obtained by subtracting 1 from the refractive index n of the objective lens 10. It should be noted that when the tilt sensitivity is close to 1.000, the amount of coma caused with respect to a certain tilt angle stays unchanged regardless of the temperature change within the range of 35° C. to 80° C.

More specifically, FIG. 2 is a graph illustrating the relationship between the tilt sensitivity and the refractive index (n−1) defined when the objective lens 10 is designed to have the thickness d of 1.70 or 1.85 (unit: mm) on the optical axis. FIG. 3 is a graph illustrating the relationship between the tilt sensitivity and the refractive index (n−1) when the objective lens 10 is designed to have the focal length f of 1.18, 1.41 or 1.77 (unit: mm) with respect to the wavelength λ. The graph of FIG. 2 is a verification result obtained by verifying the optical performance of the objective lens 10 having the same specifications other than the thickness d and the refractive index n. The graph of FIG. 3 is a verification result obtained by verifying the optical performance of the objective lens 10 having the same specifications other than the focal length f and the refractive index n.

As can be seen from FIG. 2, the larger the refractive index n becomes, the larger the tilt sensitivity becomes, and the larger the thickness d of the objective lens 10 on the optical axis becomes, the larger the tilt sensitivity becomes. As can be seen from FIG. 3, the larger the refractive index n of the objective lens 10 becomes, the larger the tilt sensitivity becomes, and the shorter the focal length f becomes, the larger the tilt sensitivity becomes. That is, based on the verification results shown in FIGS. 2 and 3, the inventors of the present invention have found that as the thickness d increases, the refractive index n increases or the focal length f decreases, the tilt sensitivity approaches 1.00, decrease (i.e., the change of the amount of coma, or, in another point of view, the increase of the amount of coma with respect to a tilt angle under the low temperature condition) of the amount of coma caused with respect to a certain tilt angle under the high temperature condition is effectively suppressed, and consequently the temperature characteristic of the objective lens 10 concerning the coma is improved.

As shown in FIGS. 2 and 3, the amount of coma with respect to a certain tilt angle becomes smaller at a point closer to the tilt sensitivity of 0.000 under the high temperature condition, or the amount of coma with respect to a certain tilt angle becomes larger at a point closer to the tilt sensitivity of 0.000 under the low temperature condition. With regard to the former case, it is necessary to further tilt the objective lens 10 under the high temperature condition. Therefore, a heavy load is placed on the tilt actuator 16, which is undesirable. With regard to the latter case, precise control of the amount of coma through the tilt adjustment under the low temperature condition becomes difficult, which is also undesirable. When the tilt sensitivity is equal to or lower than 0.000, the coma does not occur even if the objective lens 10 is tilted under the high temperature condition of 80° C. (or 35° C. to 80° C.). In this case, a problem that the come can not be corrected by tilting of the objective lens 10 occurs.

In view of the above described analysis, the objective lens 10 according to the embodiment is configured to satisfy the following condition (1).

$$0.48 < \frac{d \cdot (n-1)}{f^2} < 0.75 \tag{1}$$

When the intermediate term of the condition (1) gets higher than the upper limit of the condition (1), the focal length f becomes too small, or the thickness d becomes too large. In this case, it becomes difficult to secure an adequate working distance WD between the surface of the protective layer of the optical disc D1 and a vertex of the second surface 12 of the objective lens 10. Furthermore, in this case, the amount of material of the objective lens increases, which leads to increase of the manufacturing cost.

On the other hand, when the intermediate term of the condition (1) gets smaller than the lower limit of the condition (1), the focal length f becomes too long, the thickness d becomes too small, or the refractive index n becomes too small. In this case, decrease of the tilt sensitivity can not be avoided. Therefore, concerns, such as increase of the load on the actuator 16 or the decrease of the accuracy of correction for the coma caused when the temperature changes from the design reference temperature, arise. When the intermediate term of the condition (1) gets smaller considerably than the lower limit of the condition (1), the tilt sensitivity becomes lower than or equal to 0.000. In this case, a possibility that it becomes impossible to correct the coma due to tilting of the objective lens 10 arises.

For this reason, the objective lens 10 is configured to satisfy the condition (1). By satisfying the condition (1), it becomes possible to shorten the focal length for to increase the thickness d while securing an adequate working distance WD. As a result, the tilt sensitivity increases (i.e., the change of the amount of coma with respect to a certain tilt angle due to the temperature change is suppressed effectively), and therefore the temperature characteristic regarding the coma improves. Since it is also possible to shorten the focal length for to increase the thickness d, and further to increase the refractive index n while securing an adequate working distance WD, the tilt sensitivity increases and thereby the temperature characteristic improves. That is, since the objective lens 10 is able to effectively suppress change of the amount of coma due to the temperature change, the problems of increase of the load on the tilt actuator 16 and the decrease of the accuracy of correction for the coma can be avoided effectively.

When the objective lens 10 according to the embodiment is formed to be an objective lens having an annular zone structure on at least one surface, for example, on the first surface 11, the objective lens 10 may be configured to further satisfy the condition (2) in addition to the condition (1).

$$0.1 < \frac{\left(\sum \phi_{0.95-1.00}\right)}{\left(\sum \phi_{0.00-1.00}\right)} < 0.5 \tag{2}$$

In the condition (2), $(\Sigma \phi_{0.00-1.00})$ represents a sum of the heights of all the steps formed in the effective beam diameter (i.e., the pupil coordinate) on the lens surface on which the annular zone structure is formed, and $(\Sigma \phi_{0.95-1.00})$ represents a sum of the heights of all the steps formed in the range of 95% to 100% of the effective beam radius with respect to the optical axis of the objective lens 10. It should be understood that, although the annular zone structure may be formed on at least one of the first surface 11 and the second surface 12 of the objective lens 10, it is preferable that the annular zone structure is formed on the first surface 11.

According to the embodiment, two types of objective lenses that satisfy the condition (2) are provided. The first type is an objective lens configured such that the heights of the steps are approximately equal to each other, and the steps are arranged closely in the peripheral portion within the effective beam radius on the first surface 11 (i.e., within the range of 95% to 100% of the effective beam radius). The second type is configured such that the steps are arranged at constant intervals on the pupil coordinate and the heights of the steps located in the peripheral portion are larger than the heights of the steps located in the inner portion. In this embodiment, the first type is explained. FIG. 4 schematically illustrates the configuration of the objective lens according to the embodiment. As shown in FIG. 4 (particularly in an enlarged view A in FIG. 4), the annular zone structure is formed on the first surface 11 of the objective lens 10 (i.e., an objective lens having an annular zone structure) such that the steps are arranged more closely in the peripheral portion on the first surface 11 relative to the central portion.

By configuring the objective lens 10 (an objective lens having an annular zone structure) to satisfy the condition (2), it becomes possible to correct more reliably change of the amount of coma caused by the temperature change with respect to a certain tilt angle, through the effect of the annular zone structure. According to another aspect, by satisfying the condition (2), it becomes possible to suppress the amount of spherical aberration caused by the temperature change. As a result, the change of the magnification becomes small, and thereby the change of the amount of coma can be suppressed.

When the intermediate term of the condition (2) gets larger than the upper limit of the condition (2), the density of arrangement of the steps in the peripheral portion of the effective beam radius becomes too high, and thereby the size of each step in the peripheral portion becomes extremely small. In this case, it becomes difficult to properly inject resin into a metal mold, and the required size and the shape of the objective lens 10 can not be achieved stably. That is, a concern about decrease of the yield arises. If the desired size and shape of the objective lens can not be obtained, light hardly passes through the peripheral portion of the objective lens. In this case, it becomes difficult to secure the required NA for information recording/reproducing for the optical disc D1.

On the other hand, when the intermediate term of the condition (2) gets lower than the lower limit of the condition (2), it becomes impossible to achieve adequate correction (hereafter, referred to as "temperature compensation") for the change of the amount of coma with respect to a certain tilt angle due to the temperature change. That is, it becomes impossible to achieve the adequate effect of the temperature compensation with respect to the development cost and the manufacturing cost for the annular zone structure. That is, it is undesirable in regard to cost effectiveness.

As another embodiment (a third type) of the objective lens having an annular zone structure, the objective lens may be configured to satisfy the following conditions (3) and (4).

$$0.40 < \frac{d \cdot (n-1)}{f^2} < 0.70 \quad (3)$$

$$0.2 < \frac{\left(\sum \phi_{0.95\text{-}1.00}\right)}{\left(\sum \phi_{0.00\text{-}1.00}\right)} < 0.6 \quad (4)$$

The third type is able to further decrease the thickness d and to increase the focal length f in comparison with the above described objective lens satisfying the conditions (1) and (2). Therefore, the third type is able to secure an adequate working distance WD more easily. The decrease of the tilt sensitivity due to shortening of the thickness d and increasing of the focal length f can be corrected by providing the steps such that the density of arrangement of the steps becomes further higher in the peripheral portion of the effective beam radius of the first surface 11.

It should be noted that in order to effectively avoid the increase of the size of the objective lens having an annular zone structure and the objective lens not having an annular zone structure, it is preferable that the focal length f falls within the range of 1.0 to 1.5. That is, to set the focal length f to be relatively short is preferable.

Each of FIGS. 5A, 5B, 6A and 6B is a graph illustrating the spherical aberration SA and the offence against the sine condition SC of the objective lens 10 caused when the optical disc D1 is used. It should be noted that the graphs of FIGS. 5A to 6B are plotted for the objective lens having the same specifications. In each of FIGS. 5A to 6B (and in the following similar graphs), a curve indicated by a solid line represents the spherical aberration SA, and a curve indicated by a dashed line represents the offence against the sine condition SC. In each of FIGS. 5A to 6B (and in the following similar graphs), the vertical axis represents the entrance pupil coordinate, and the horizontal axis represents the amount of the spherical aberration (unit: mm) or the offence against the sine condition.

FIGS. 5A and 5B are aberration diagrams of the objective lens configured to suitably correct the coma under the design reference temperature condition (35° C.). More specifically, FIG. 5A is the aberration diagram of the objective lens under the design reference temperature condition, and FIG. 5B is the aberration diagram of the objective lens under the high temperature condition (80° C.). As shown in FIG. 5B, under the high temperature condition (80° C.), the offence against the since condition takes a local maximum value within the range of 30% to 50% of the effective beam radius with respect to the optical axis of the objective lens, and becomes an undercorrected condition at a point closer to the peripheral portion. This is because the change of the offence against the sine condition in the direction toward the undercorrected condition due to temperature change toward the high temperature and the change of the offence against the since condition in the direction toward the undercorrected condition due to the magnification change (i.e., the magnification change caused by shifting the collimator 2 in the optical axis (AX) direction to correct the spherical aberration) are added together. As the degree of the change of the offence against the sine condition toward the under corrected condition becomes steeper, the degree of tilt sensitivity of the objective lens tends to become small.

In view of such phenomena, according to the embodiment, the objective lens is intentionally designed such that the offence against the sine condition SC becomes the overcorrected condition in the peripheral portion of the effective beam diameter under the design reference temperature condition (35° C.) so that decrease of the tilt sensitivity under the high temperature condition is suppressed more suitably. More specifically, the objective lens is configured such that, under the reference temperature condition (35° C.), the offence against the sine condition takes a local minimum value within the range larger than or equal to 20% and lower than 80% of the effective beam radius, the offence against the sine condition takes the maximum value within the range of 80% to 100% of the effective beam radius, and the maximum value falls within the range of 0.001 to 0.01.

By designing the objective lens such that, under the design reference temperature condition (35° C.) and at a relatively large design value of the protective layer thickness, the offence against the sine condition SC becomes equal to the spherical aberration at the 100% point of the effective beam radius, it becomes possible to further suitably suppress the decrease of the tilt sensitivity under the high temperature condition. More specifically, in this case, the objective lens is configured such that, under the design reference temperature condition (35° C.) and within the protective layer thickness of 0.105 to 0.15 (unit: mm), and the offence against the since condition is equal to the spherical aberration at the 100% point of the effective beam radius.

FIGS. 6A and 6B are aberration diagrams of the objective lens designed based on the above described technical concept. More specifically, FIG. 6A is an aberration diagram of the objective lens under the design reference temperature condition (35° C.), and FIG. 6B is the aberration diagram of the objective lens under the high temperature condition (80° C.). As shown in FIG. 6A, the offence against the sine condition becomes the overcorrection condition at a point closer to the peripheral portion of the effective beam radius so that the coma is caused intentionally. When the objective lens designed as described above, the offence against the sine condition is corrected under the high temperature condition (80° C.) as shown in FIG. 6B.

With regard to the objective lens shown in FIGS. 5A and 5B, the third order coma caused when the objective lens is tilted by 1.0 degree under the design reference temperature condition (35° C.) is 0.098, while the third order coma caused when the objective lens is tilted by 1.0 degree under the high temperature condition (80° C.) is 0.023. In this case, the tilt sensitivity is 0.24. Therefore, in order to correct the coma under the high temperature condition (80° C.), it becomes necessary to tilt the objective lens by a tilt angle which is four times as large as a tilt angle defined at the design reference temperature (35° C.).

With regard to the objective lens shown in FIGS. 6A and 6B, the third order coma caused when the objective lens is tilted by 1.0 degree under the design reference temperature condition (35° C.) is 0.161, while the third order coma caused when the objective lens is tilted by 1.0 degree under the high temperature condition (80° C.) is 0.083. That is, the deceasing amount of the coma is suppressed. In this case, the tilt sensitivity is 0.52. Therefore, in order to correct the coma under the high temperature condition (80° C.), it is only required to tilt the objective lens 10 by a tilt angle which is two times as large as the tilt angle defined under the design temperature condition (35° C.). That is, when configuring the objective lens to have the aberration characteristic shown in FIGS. 6A and 6B, the tilt angle to be controlled by the tilt actuator 16 is further suppressed, and therefore the load placed on the tilt actuator 16 can be reduced.

Second Embodiment

Hereafter, an objective lens and an optical information recording/reproducing apparatus according to a second embodiment of the invention are described.

For the sake of simplicity, to elements which are substantially the same as those of the first embodiment, the same reference numbers are assigned and explanations thereof will not be repeated. FIG. 23 is a block diagram of an optical information recording/reproducing apparatus 100B having an objective lens 10B according to the second embodiment. As shown in FIG. 23, the optical information recording/reproducing apparatus 100B includes a light source 51, a half mirror 52, a collimator 53, a photoreceptor 54 and the objective lens 10B. In FIG. 23, a reference axis AX of optical components of the optical information recording/reproducing apparatus 100B is indicated by a chain line. In FIG. 23, a light beam proceeding toward the optical disc D1 and a returning light beam from the optical disc D1 are represented by a solid line.

The light source 1 is a semiconductor laser which emits a blue laser beam having a design reference wavelength of 406 nm. In consideration of the use environment and individual differences of the light sources, the wavelength λ (unit: nm) of the laser light from the light source 1 varies in the range of several nm to several tens of nm.

As shown in FIG. 23, the laser beam emitted by the light source 1 is deflected by the half mirror 52 to be incident on the collimator 53. The collimator 53 converts the incident laser beam into a collimated beam. Then, the collimated beam is incident on a first surface 11B of the objective lens 10B. The laser beam which has entered the objective lens 10B through the first surface 11B exits from the objective lens 10B through a second surface 12B. The objective lens 10B converges the laser beam at the vicinity of the recoding surface of the optical disc D1 being used. The converged laser beam forms a suitable beam spot on the recording surface of the optical disc D1 in a state where aberrations are corrected. The laser beam reflected from the optical disc D1 returns toward the half mirror 52 along the same optical path for the laser beam proceeding to the optical disc D1, and is received by the photoreceptor 54.

The photoreceptor 54 executes photoelectric conversion with respect to the received laser beam to generate analog signals, and outputs the analog signals to a signal processing circuit (not shown). The signal processing circuit converts the inputted analog signals into a bit stream and executes an error correction process for the bit stream. Then, the signal processing circuit separates the bit stream, for which the error correction process has been executed, into streams such as an audio stream and a video stream, and decodes the streams. The signal processing circuit outputs an audio signal and a video signal, which are obtained by decoding, to a speaker and a display (not shown), respectively. Thus, the audio and video recorded on the optical disc D1 are reproduced through the speaker and the display, respectively.

The objective lens 10B is configured such that the numerical aperture NA defined on the optical disc D1 side when the laser beam having the wavelength λ is used falls within the range of 0.8 to 0.87.

The objective lens 10B is a resin lens made of synthetic resin, and therefore is light in weight relative to a glass lens. Therefore, the load to be placed on an actuator (not shown) for driving the objective lens 10B can be decreased in comparison with the case where the objective lens 10B is made of glass. It is understood that using resin as material of the objective lens 10B is advantageous in regard to various aspects including the easiness of manufacturing, productivity and cost as well as the reduction in weight. As material of the objective lens 10B, resin having the refractive index n falling within the range of 1.4 to 1.7 with respect to the wavelength λ is used, for example.

The objective lens 10B is mounted on the optical information recording/reproducing apparatus 100B in a state where the coma due to, for example, decentering of the objective lens 10B has been corrected by adjusting the tilt angle of the objective lens 10B under the design reference temperature (35° C.). As described above, when the temperature change occurs, the offence against the sine condition changes, and also the amount of coma with respect to a certain tilt angle changes. In this case, it becomes impossible to form a suitable beam spot on the recording surface of the optical disc D1. For this reason, the objective lens 10B according to the second embodiment is configured to effectively suppress the amount of coma with respect to a certain tilt angle doe to the temperature change, and thereby to have suitable optical performance for the information recording/reproducing for the optical disc D1.

It should be noted that a resin lens shows remarkable fluctuations in the amount of coma with respect to a certain tilt angle due to the temperature change in comparison with a glass lens. In this embodiment, the objective lens 10B is configured to effectively suppress the fluctuations in the amount of coma with respect to a certain tilt angle due to the temperature change regardless of the fact that the objective lens 10B is made of resin.

A concrete configuration of the objective lens 10B will now be described. Each of the first and second surfaces 11B and 12B of the objective lens 10B is formed to be an aspherical surface. A shape of an aspherical surface is expressed by a following equation:

$$X(h) = \frac{ch^2}{1 + \sqrt{1 - (1+K)c^2h^2}} + \sum_{i=2} A_{2i} h^{2i}$$

where, X(h) represents a SAG amount which is a distance between a point on the aspherical surface at a height of h from the optical axis and a plane tangential to the aspherical surface at the optical axis, symbol c represents curvature on the optical axis (i.e., 1/r when r represents a curvature radius (unit: mm)), K is a conical coefficient, and $A_{2i}$ (i: an integer larger than or equal to 2) represents an aspherical coefficient of an even order larger than or equal to the fourth order. By forming each of the first and second surfaces 11 and 12 of the objective lens to be an aspherical surface, it becomes possible to appropriately control the various aberrations including the spherical aberration and the coma.

According to the embodiment, two types of examples of the objective lens 10B are provided. The first type of the objective lens 10B is configured such that both of the first and second surfaces 11B and 12B are formed to be aspherical surfaces. The second type of the objective lens 10B is configured such that both of the first and second surfaces 11B and 12B are formed to be aspherical surfaces and an annular zone structure is formed on one of the first and second surfaces 11B and 12B. In the following, when it is necessary to explain the first type and the second type of the objective lens 10B separately, the first type is referred to as "an objective lens not having an annular zone structure" and the second type is referred to as "an objective lens having an annular zone structure".

The annular zone structure includes a plurality of refractive surface zones (annular zones) concentrically formed about the optical axis of the objective lens 10B. The plurality of annular zones are divided by minute steps which are formed at boundaries between adjacent ones of the plurality of annular zones and which extend in parallel with the optical axis.

In general, the annular zone structure is formed on the first surface 11B of the objective lens 10B. When the annular zone structure is formed on the first surface 11B of the objective lens 10B, it becomes possible to form the annular zone structure such that the minimum annular zone width becomes relatively broad. As a result, the advantage that the loss of light by each step between the adjacent annular zones is suppressed can be achieved.

Furthermore, the first surface 11B on which the annular zone structure is formed does not face the optical disc D1. Such a configuration achieves the advantages that debris does not adhere to the first surface 11B and the annular zones do not wear when the objective lens 10B is wiped with a lens cleaner.

Each step in the annular zone structure is designed such that a predetermined optical path length difference is caused between a laser beam passing through the inside of a boundary and a laser beam passing through the outside of the boundary. It is noted that such an annular zone structure may be called a diffraction structure.

If the annular zone structure is designed such that the predetermined optical path length difference is an n-fold value (n: integer) of a particular wavelength α, the annular zone structure may be expressed as an n-th order diffraction structure having a blazed wavelength α. If a laser beam having a particular wavelength β passes through the diffraction structure, the diffraction order having the highest diffraction efficiency is equal to an integer "m" closest to a value obtained by dividing the optical path length difference given to the beam of the wavelength β.

Considering the fact that an optical path length difference is caused between the laser beam passing through the inside of a boundary and the laser beam passing through the outside of the boundary, the effect of the annular zone structure may be expressed in such a manner that the phase of the laser beam passing through the inside of the boundary and the phase of the laser beam passing through the outside of the boundary shift with respect to each other by the effect of the step. Therefore, the annular zone structure may be called a structure for shifting the phase of an incident light beam (i.e., a phase shift structure).

If the annular zone structure is considered as the diffraction structure, the annular zone structure can be expressed by a following optical path difference function $\phi(h)$:

$$\phi(h) = (P_2 \times h^2 + P_4 \times h^4 + P_6 \times h^6 + P_8 \times h^8 + P_{10} \times h^{10} + P_{12} \times h^{12}) m\lambda$$

where $P_2$, $P_4$, $P_6$ ... represent coefficients of the $2^{nd}$ order, $4^{th}$ order, $6^{th}$ order, h represents a height from the optical axis, m represents a diffraction order at which the diffraction efficiency is maximized, and λ represents a design wavelength of a laser beam being used.

The inventors of the present invention have found relationships shown in FIGS. 24 and 25 where a value obtaining by subtracting a value of the third order coma caused when the objective lens is tilted by 1.0 degree under the design reference temperature condition (35° C.) from a value of the third order coma caused when the objective lens is tilted by 1.0 degree under the high temperature condition (80° C.) (i.e., a difference between the amounts of coma caused when the temperature change occurs) is defined as a tilt property change amount (unit: rms). In each of FIGS. 24 and 25, the vertical axis represents the tilt property change amount, and the horizontal axis represents a value obtained by subtracting 1 from the refractive index n of the objective lens (hereafter, referred to as "refractive index n−1").

More specifically, FIG. 24 is a graph illustrating the relationship between the tilt property change amount and the refractive index n−1 defined when the objective lens is designed such that the thickness d (unit: mm) of the objective lens along the optical axis is 1.70 or 1.85. FIG. 25 is a graph illustrating the relationship between the tilt property change amount and the refractive index n−1 defined when the objective lens is designed such that the focal length f (unit: mm) with respect to the wavelength λ is 1.18, 1.41 or 1.77. It should be noted that the graph of FIG. 24 shows results of the validations obtained by using the objective lens having the same specification excepting the thickness d and the refractive index n, and that the graph of FIG. 25 shows results of the validations obtained by using the objective lens having the same specifications excepting the focal length f and the refractive index n.

As described above, the optical information recording/reproducing apparatus 100B does not have a feedback mechanism configured to execute the tilt adjustment for the objective lens 10B in accordance with the temperature change. That is, the objective lens 10B has been fixed at the tilting angle set by the tilt adjustment executed during the manufacturing under the design reference temperature condition (35° C.). Therefore, the tilt property change amount caused when the temperature changes from the design reference temperature (35° C.) appears as the coma without change. In order to achieve the suitable temperature characteristic for the coma, it is necessary to decrease the tilt property change amount and to effectively suppress the fluctuation of the amount of coma with respect to a certain tilt angle due to the temperature change.

As shown in FIG. 24, the larger the refractive index n of the objective lens becomes, the smaller the tilt property change amount becomes. Further, the larger the thickness d of the objective lens along the optical axis becomes, the smaller the tilt property change amount becomes. As shown in FIG. 25, the larger the refractive index n of the objective lens becomes, the smaller the tilt property change amount becomes. Further, the shorter the focal length f of the objective lens with respect to the wavelength λ becomes, the smaller the tilt property change amount becomes. In other words, the inventors found that based on the evaluation of the relationships shown in FIGS. 24 and 25, the larger the thickness d of the objective lens becomes or the larger the refractive index n becomes, the superior the temperature characteristic for the coma becomes. In consideration of the above described evaluation, according to the embodiment, the objective lens is configured to satisfy the following condition (1).

$$0.48 < \frac{d \cdot (n-1)}{f^2} < 0.75 \qquad (1)$$

When the intermediate term of the condition (1) gets higher than the upper limit of the condition (1), the focal length f becomes too small, or the thickness d becomes too large. In this case, it becomes difficult to secure an adequate working distance WD between the surface of the protective layer of the optical disc D1 and a vertex of the second surface 12B of the objective lens 10B. Furthermore, in his case, the amount of material of the objective lens increases, which leads to increase of the manufacturing cost.

On the other hand, when the intermediate term of the condition (1) gets smaller than the lower limit of the condition (1), the focal length f becomes too long, the thickness d becomes too small, or the refractive index n becomes too small. In this case, increase of the tilt property change amount can not be avoided. Therefore, a problem, that a large amount of coma occurs when the temperature changes from the design reference temperature (35° C.) and it becomes difficult to form a suitable beam spot on the recording surface of the optical disc, arises.

For this reason, the objective lens 10B is configured to satisfy the condition (1). In this case, it becomes possible to shorten the focal length f for to increase the thickness d while securing an adequate working distance WD. As a result, the tilt property change amount can be suppressed while improving the temperature characteristic for the coma. Since it is also possible to shorten the focal length for to increase the thickness d, and further to increase the refractive index n while securing an adequate working distance WD, the tilt property change amount can be suppressed and thereby the temperature characteristic for the coma improves. That is, since the objective lens 10B is able to effectively suppress change of the amount of coma due to the temperature change, it becomes possible to form a suitable beam spot on the recording surface of the optical disc D1.

When the objective lens 10B according to the embodiment is configured to be an objective lens having an annular zone structure on at least one surface, for example, on the first surface 11B, the objective lens 10B may be configured to further satisfy the condition (2) in addition to the condition (1).

$$0.1 < \frac{\left(\sum \phi_{0.95\text{-}1.00}\right)}{\left(\sum \phi_{0.00\text{-}1.00}\right)} < 0.5 \qquad (2)$$

In the condition (2), $(\Sigma\phi_{0.00\text{-}1.00})$ represents a sum of the heights of all the steps formed in the effective beam diameter (i.e., the pupil coordinate) on the lens surface on which the annular zone structure is formed, and $(\Sigma\phi_{0.95\text{-}1.00})$ represents a sum of the heights of all the steps formed in the range of 95% to 100% of the effective beam radius with respect to the optical axis of the objective lens 10B. It should be understood that, although the annular zone structure may be formed on at least one of the first surface 11 and the second surface 12 of the objective lens 10, it is preferable that the annular zone structure is formed on the first surface 11.

Two types of objective lenses that satisfy the condition (2) are provided. The first type is an objective lens configured such that the heights of the steps are approximately equal to each other, and the steps are arranged closely in the peripheral portion within the effective beam radius on the first surface 11 (i.e., within the range of 95% to 100% of the effective beam radius). The second type is configured such that the heights of the steps located in the peripheral portion are larger than the heights of the steps located in the inner portion. In this embodiment, the first type is explained. The configuration of the objective lens according to the embodiment is shown in FIG. 4. As shown in FIG. 4 (particularly in an enlarged view A in FIG. 4), the annular zone structure is formed on the first surface (11B) of the objective lens (10B) (i.e., an objective lens having an annular zone structure) such that the steps are arranged closely in the peripheral portion on the first surface (11B).

By configuring the objective lens 10B (an objective lens having an annular zone structure) to satisfy the condition (2), it becomes possible to correct more reliably change of the amount of coma caused with respect to a certain tilt angle due to the temperature change, through the effect of the annular zone structure.

If the intermediate term of the condition (2) gets larger than the upper limit of the condition (2), the density of arrangement of the steps in the peripheral portion of the effective beam radius becomes too high, and thereby the size of each step in the peripheral portion becomes extremely small. In this case, it becomes difficult to properly inject resin into a metal mold, and the required size and the shape of the objective lens 10B can not be achieved stably. That is, a concern about decrease of the yield arises. If the desired size and shape of the objective lens can not be obtained, light hardly passes through the peripheral part. In this case, it becomes difficult to secure the required NA for information recording/reproducing for the optical disc D1.

On the other hand, when the intermediate term of the condition (2) gets lower than the lower limit of the condition (2), it becomes impossible to achieve adequate correction (hereafter, referred to as "temperature compensation") for the change of the amount of coma with respect to a certain tilt angle due to the temperature change. That is, it becomes impossible to achieve the adequate effect for the temperature compensation with respect to the development cost and the manufacturing cost for the annular zone structure. That is, cost effectiveness can not be achieved.

As another embodiment (a third type) of the objective lens having an annular zone structure, the objective lens may be configured to satisfy the following conditions (3) and (4).

$$0.40 < \frac{d \cdot (n-1)}{f^2} < 0.70 \quad (3)$$

$$0.2 < \frac{\left(\sum \phi_{0.95\text{-}1.00}\right)}{\left(\sum \phi_{0.00\text{-}1.00}\right)} < 0.6 \quad (4)$$

The third type is able to decrease the thickness d and to increase the focal length f in comparison with the above described objective lens 10B satisfying the conditions (1) and (2). Therefore, the third type is able to secure an adequate working distance WD more easily. The increase of the tilt property change amount due to decreasing of the thickness d and increasing of the focal length f can be corrected by providing the steps such that the density of arrangement of the steps becomes higher in the peripheral portion of the effective beam radius of the first surface 11B.

It should be noted that in order to effectively avoid increase of the size for each of the objective lens having an annular zone structure and the objective lens not having an annular zone structure, the focal length f is restricted to fall within the range of 1.0 to 1.5 (i.e., the focal length is shortened).

Hereafter, fourteen concrete (first to fourteenth) examples of the optical information recording/reproducing apparatus having the above described objective lens are explained. Each of the first to fourteenth examples accords to each of the first and second embodiments. Therefore, each of the optical information recording/reproducing apparatuses according to first to fourteenth examples can be configured as shown in FIGS. 1 or 23. The objective lens of each of the first to third examples, the eighth to tenth examples and the fourteenth example is an objective lens not having an annular zone structure. The objective lens of each of the fourth to seventh examples and the eleventh to thirteenth examples is an objective lens having an annular zone structure. For all of the objective lenses having an annular zone structure (i.e., the fourth to seventh and the eleventh to thirteenth examples), the diffraction order m is the first order.

First Example

The specifications of the optical information recording/reproducing apparatus 100 (100B) according to the first example are shown in Table 1. More specifically, Table 1 shows the wavelength λ (unit: nm) of the laser beam used for information recording/reproducing for the optical disc D1, the focal length f (unit: mm) of the objective lens 10 (10B) defined when the optical disc D1 is used, NA, and the magnification. In the following examples, explanation of the numerical configuration focuses on the configuration of the objective lens 10 (10B) and components on the optical disc side of the objective lens 10 (10B) (i.e., the objective lens 10 (10B) and the optical disc D1) for the sake of simplicity.

TABLE 1

| wavelength (nm) | 406 |
| focal length (mm) | 1.41 |
| NA | 0.85 |
| magnification | 0.000 |

As can be seen from the value of the magnification in Table 1, the optical information recording/reproducing apparatus 100 (100B) is configured such that the collimated beam is incident on the objective lens 10 (10B). With this configuration, it becomes possible to avoid undesired off-axis aberration from occurring during the tracking shift (i.e., shift of the objective lens in the tracking direction).

Table 2 shows a specific numerical configuration of the optical information recording/reproducing apparatus 100 (100B) according to the first example defined when the optical disc D1 is used.

TABLE 2

| Surface No. | r | d | N |
|---|---|---|---|
| 1 | 0.950 | 1.85 | 1.55903 |
| 2 | −1.398 | 0.37 | |
| 3 | ∞ | 0.0875 | 1.62096 |
| 4 | ∞ | — | |

In Table 2 (and in the following similar Tables), the surface numbers #1 and #2 represent the first surface 11 (11B) and the second surface 12 (12B) of the objective lens 10 (10B), respectively, and the surface numbers #3 and #4 represent the protective layer and the recording surface of the optical disc D1, respectively. In Table 2 (and in the following similar Tables), "r" denotes the curvature radius (unit: mm) of each optical surface, and "d" denotes the thickness of an optical component or the distance (unit: mm) from each optical surface to the next optical surface, and "n" represents the refractive index at the use wavelength λ. For an aspherical optical element, "r" represents the curvature radius on the optical axis.

Each of the first surface 11 (11B) (surface #1) and the second surface 12 (12B) (surface #2) of the objective lens 10 (10B) is an aspherical surface. Each aspherical surface is optimally designed for information recording/reproducing for the optical disc D1. The following Table 3 shows, for each aspherical surface, the conical coefficients κ and even order aspherical coefficients $A_4$, $A_6$ ... larger than or equal to $4^{th}$ order. In Table 3 (and in the following similar Tables), the notation "E" means the power of 10 with an exponent specified by the number to the right of E (e.g. "E−04" means "×$10^{-4}$").

TABLE 3

| | FIRST SURFACE (#1) | SECOND SURFACE (#2) |
|---|---|---|
| κ | −1.40000E+00 | −4.20000E+01 |
| A4 | 1.36660E−01 | 3.19865E−01 |
| A6 | 1.70691E−02 | −4.18867E−01 |
| A8 | −3.46342E−02 | −2.91945E−01 |

TABLE 3-continued

|  | FIRST SURFACE (#1) | SECOND SURFACE (#2) |
|---|---|---|
| A10 | 9.10765E−02 | 1.04130E+00 |
| A12 | −8.04960E−02 | −1.28226E−01 |
| A14 | 2.70422E−02 | −1.17904E+00 |
| A16 | −1.33016E−03 | −4.50982E−02 |
| A18 | 1.39775E−02 | 2.14692E+00 |
| A20 | −1.44028E−02 | −1.87949E+00 |
| A22 | 3.60458E−03 | 4.96839E−01 |
| A24 | 0.00000E+00 | 0.00000E+00 |
| A26 | 0.00000E+00 | 0.00000E+00 |
| A28 | 0.00000E+00 | 0.00000E+00 |
| A30 | 0.00000E+00 | 0.00000E+00 |

With regard to the objective lens 10 (10B) according to the first example, the intermediate term of the condition (1) takes a value of 0.520. Therefore, the objective lens 10 (10B) according to the first example satisfies the condition (1).

The actual tilt angle of the objective lens 10 (10B) is approximately 0.2 degrees. In the case where the objective lens according to the first example is used in the optical information recording/reproducing apparatus 100 according to the first embodiment, fluctuation of the amount of coma (i.e., increase of the amount of coma in the low temperature condition or decrease of the amount of coma in the high temperature condition) caused by the temperature change is suppressed when the tilt sensitivity is larger than or equal to 0.200. Since the amount of coma changes linearly with respect to the tilt angle, the tilt sensitivity takes a constant value regardless of the angle. The tilt sensitivity of the objective lens 10 according to the first example is 0.357. That is, the tilt sensitivity is larger than or equal to 0.200. Therefore, by satisfying the condition (1), the objective lens 10 according to the first example is able to suppress the fluctuation of the amount of coma caused by the temperature change while achieving the suitable optical performance of the information recording/reproducing for the optical disc D1. Consequently, it becomes possible to avoid increase of the load placed on the tilt actuator 16 and decrease of the accuracy of correction for the coma.

As described above, the actual tilt angle of the objective lens is approximately 0.2 degrees. In this case, with regard to the objective lens 10B according to the first example, the amount of coma caused by the temperature change has been suppressed to a small level when the tilt property change amount is smaller than or equal to 0.020 (i.e., the tilt property change amount defined when the objective lens 10B is tilted by 1.0 degree is 0.100). According to the first example, the tilt property change amount is 0.063 which is smaller than or equal to 0.100. That is, by satisfying the condition (1), the amount of coma due to the temperature change can be suppressed effectively, and therefore it becomes possible to form a suitable beam spot on the recording surface of the optical disc.

FIG. 7A is an aberration diagram of the objective lens 10 (10B) according to the first example under the condition of the design reference temperature (35° C.). FIG. 7B is an aberration diagram of the objective lens 10 (10B) according to the first example under the high temperature condition (80° C.). As shown in FIGS. 7A and 7B, both of the spherical aberration and the coma are suitably corrected in the design reference temperature condition and in the high temperature condition.

Second Example

Hereafter, a second example is explained. Table 4 shows the specifications of the objective lens 10 (10B) according to the second example. Table 5 shows a specific numerical configuration of the optical information recording/reproducing apparatus 100 (100B) according to the second example defined when the optical disc D1 is used. Table 6 shows the coefficients of each aspherical surface of the objective lens 10 (10B) according to the second example.

TABLE 4

| wavelength (nm) | 406 |
|---|---|
| focal length (mm) | 1.41 |
| NA | 0.85 |
| magnification | 0.000 |

TABLE 5

| Surface No. | r | d | n |
|---|---|---|---|
| 1 | 1.011 | 1.70 | 1.64951 |
| 2 | −3.307 | 0.42 |  |
| 3 | ∞ | 0.0875 | 1.62096 |
| 4 | ∞ | — |  |

TABLE 6

|  | FIRST SURFACE (#1) | SECOND SURFACE (#2) |
|---|---|---|
| κ | −1.40000E+00 | −2.25000E+02 |
| A4 | 1.18467E−01 | 2.11074E−01 |
| A6 | 1.31643E−02 | −1.55717E−01 |
| A8 | −2.59630E−02 | −4.08575E−01 |
| A10 | 7.58336E−02 | 4.81816E−01 |
| A12 | −7.93554E−02 | 2.93284E−01 |
| A14 | 4.08462E−02 | −2.53262E−01 |
| A16 | −1.08479E−02 | −4.42038E−01 |
| A18 | 1.01290E−02 | −1.05274E−01 |
| A20 | −8.87378E−03 | 4.06762E−01 |
| A22 | 2.12448E−03 | 4.62721E−01 |
| A24 | 0.00000E+00 | −4.69234E−01 |
| A26 | 0.00000E+00 | 0.00000E+00 |
| A28 | 0.00000E+00 | 0.00000E+00 |
| A30 | 0.00000E+00 | 0.00000E+00 |

With regard to the objective lens 10 (10B) according to the second example, the value of the intermediate term of the condition (1) is 0.555. Therefore, the condition (1) is satisfied.

With regard to the objective lens 10 according to the second example, the tilt sensitivity is 0.335. That is, the objective lens 10 according to the second example is able to suppress the fluctuation of the amount of coma caused by the temperature change by satisfying the condition (1), while achieving the suitable optical performance of the information recording/reproducing for the optical disc D1 as in the case of the first example. Consequently, it becomes possible to effectively avoid increase of the load placed on the tilt actuator 16 and decrease of the accuracy of correction for the coma.

With regard to the objective lens 10B according to the second example, the tilt property change amount is 0.065. That is, the objective lens 10B according to the second example is able to effectively suppress the amount of coma due to the temperature change. Consequently, it becomes possible to form a suitable beam spot on the recording surface of the optical disc.

FIG. 8A is an aberration diagram of the objective lens 10 (10B) according to the second example under the condition of the design reference temperature (35° C.). FIG. 8B is an aberration diagram of the objective lens 10 (10B) according to the second example under the high temperature condition (80° C.). As shown in FIGS. 8A and 8B, both of the spherical aberration and the coma are suitably corrected in the design reference temperature condition and in the high temperature condition.

Third Example

Hereafter, a third example is explained. Table 7 shows the specifications of the objective lens 10 (10B) according to the third example. Table 8 shows a specific numerical configuration of the optical information recording/reproducing apparatus 100 (100B) according to the third example defined when the optical disc D1 is used. Table 9 shows the coefficients of each aspherical surface of the objective lens 10 (10B) according to the third example.

TABLE 7

| | |
|---|---|
| wavelength (nm) | 406 |
| focal length (mm) | 1.41 |
| NA | 0.85 |
| magnification | 0.000 |

TABLE 8

| Surface No. | r | d | n |
|---|---|---|---|
| 1 | 0.917 | 1.85 | 1.52350 |
| 2 | −1.162 | 0.38 | |
| 3 | ∞ | 0.0875 | 1.62096 |
| 4 | ∞ | — | |

TABLE 9

| | FIRST SURFACE (#1) | SECOND SURFACE (#2) |
|---|---|---|
| κ | −1.40000E+00 | −2.85000E+01 |
| A4 | 1.49157E−01 | 3.16378E−01 |
| A6 | 1.43062E−02 | −3.98412E−01 |
| A8 | −2.38381E−02 | −2.43295E−01 |
| A10 | 7.63273E−02 | 9.29876E−01 |
| A12 | −6.75765E−02 | −1.18728E−01 |
| A14 | 2.18167E−02 | −1.09125E+00 |
| A16 | 1.19699E−03 | −1.44591E−02 |
| A18 | 1.33138E−02 | 2.07351E+00 |
| A20 | −1.53531E−02 | −1.93579E+00 |
| A22 | 4.15915E−03 | 5.57190E−01 |
| A24 | 0.00000E+00 | 0.00000E+00 |
| A26 | 0.00000E+00 | 0.00000E+00 |
| A28 | 0.00000E+00 | 0.00000E+00 |
| A30 | 0.00000E+00 | 0.00000E+00 |

With regard to the objective lens 10 (10B) according to the third example, the value of the intermediate term of the condition (1) is 0.487. Therefore, the condition (1) is satisfied.

With regard to the objective lens 10 according to the third example, the tilt sensitivity is 0.238. That is, the objective lens 10 according to the third example is able to suppress the fluctuation of the amount of coma caused by the temperature change by satisfying the condition (1), while achieving the suitable optical performance of the information recording/reproducing for the optical disc D1 as in the case of the first and second examples. Consequently, it becomes possible to effectively avoid increase of the load placed on the tilt actuator 16 and decrease of the accuracy of correction for the coma.

With regard to the objective lens 10B according to the third example, the tilt property change amount is 0.075. That is, the objective lens 10B according to the third example is able to effectively suppress the amount of coma due to the temperature change as in the case of the first and second examples. Consequently, it becomes possible to form a suitable beam spot on the recording surface of the optical disc.

FIG. 9A is an aberration diagram of the objective lens 10 (10B) according to the third example under the condition of the design reference temperature (35° C.). FIG. 9B is an aberration diagram of the objective lens 10 (10B) according to the third example under the high temperature condition (80° C.). As shown in FIGS. 9A and 9B, both of the spherical aberration and the coma are suitably corrected in the design reference temperature condition and in the high temperature condition.

Fourth Example

Hereafter, a fourth example is explained. Table 10 shows the specifications of the objective lens 10 (10B) according to the fourth example. Table 11 shows a specific numerical configuration of the optical information recording/reproducing apparatus 100 (100B) according to the fourth example defined when the optical disc D1 is used. Table 12 shows the coefficients of each aspherical surface of the objective lens 10 (10B) according to the fourth example.

TABLE 10

| | |
|---|---|
| wavelength (nm) | 406 |
| focal length (mm) | 1.41 |
| NA | 0.85 |
| magnification | 0.000 |

TABLE 11

| Surface No. | r | d | n |
|---|---|---|---|
| 1 | 0.955 | 1.85 | 1.55903 |
| 2 | −1.380 | 0.38 | |
| 3 | ∞ | 0.0875 | 1.62096 |
| 4 | ∞ | — | |

TABLE 12

| | FIRST SURFACE (#1) | SECOND SURFACE (#2) |
|---|---|---|
| κ | −1.40000E+00 | −3.87000E+01 |
| A4 | 1.47802E−01 | 3.11755E−01 |
| A6 | −3.75508E−02 | −6.60641E−01 |
| A8 | 3.59698E−02 | 4.66941E−01 |
| A10 | 1.04100E−02 | 2.33284E−02 |
| A12 | −1.54410E−02 | −1.35314E−01 |
| A14 | 1.13343E−02 | −1.03452E−01 |
| A16 | −1.68979E−02 | 3.34564E−02 |
| A18 | 1.67374E−02 | 1.32123E−01 |
| A20 | −6.74259E−03 | 3.99518E−02 |
| A22 | 2.01652E−04 | −1.64929E−02 |
| A24 | 0.00000E+00 | 6.51504E−02 |
| A26 | 0.00000E+00 | 0.00000E+00 |
| A28 | 0.00000E+00 | 0.00000E+00 |
| A30 | 0.00000E+00 | 0.00000E+00 |

The objective lens 10 (10B) according to the fourth example is an objective lens having an annular zone structure on the first surface 11 (11B). With regard to the annular zone structure formed on the first surface 11 (11B) of the objective lens 10 (10B), Table 13 shows even order coefficients for the optical path difference function φ(h) larger than or equal to the second order.

TABLE 13

| | Surface #1 |
|---|---|
| P2 | 0.00000E+00 |
| P4 | 1.82000E+01 |
| P6 | -6.61000E+01 |
| P8 | 6.01500E+01 |
| P10 | -1.79000E+01 |
| P12 | -9.00000E-01 |

With regard to the objective lens 10 (10B) according to the fourth example, the values of the intermediate terms of the conditions (1) and (2) are 0.520 and 0.32, respectively. Therefore, the conditions (1) and (2) (or the conditions (3) and (4)) are satisfied.

With regard to the objective lens 10 according to the fourth example, the tilt sensitivity is 0.440. That is, the objective lens 10 according to the fourth example is able to suppress the fluctuation of the amount of coma caused by the temperature change by satisfying the conditions (1) and (2) (or the conditions (3) and (4)), while achieving the suitable optical performance of the information recording/reproducing for the optical disc D1. Consequently, it becomes possible to effectively avoid increase of the load placed on the tilt actuator 16 and decrease of the accuracy of correction for the coma.

With regard to the objective lens 10B according to the fourth example, the tilt property change amount is 0.056. That is, the objective lens 10B according to the fourth example is able to suppress the amount of coma due to the temperature change by satisfying the conditions (1) and (2) (or the conditions (3) and (4)). Consequently, it becomes possible to form a suitable beam spot on the recording surface of the optical disc.

FIG. 10A is an aberration diagram of the objective lens 10 (10B) according to the fourth example under the condition of the design reference temperature (35° C.). FIG. 10B is an aberration diagram of the objective lens 10 (10B) according to the fourth example under the high temperature condition (80° C.). As shown in FIGS. 10A and 10B, both of the spherical aberration and the coma are suitably corrected in the design reference temperature condition and in the high temperature condition.

Fifth Example

Hereafter, a fifth example is explained. Table 14 shows the specifications of the objective lens 10 (10B) according to the fifth example. Table 15 shows a specific numerical configuration of the optical information recording/reproducing apparatus 100 (100B) according to the fifth example defined when the optical disc D1 is used. Table 16 shows the coefficients of each aspherical surface of the objective lens 10 (10B) according to the fifth example. Table 17 shows the coefficients for the optical path difference function $\phi(h)$ defining the annular zone structure formed on the first surface 11 (11B) of the objective lens 10 (10B).

TABLE 14

| | |
|---|---|
| wavelength (nm) | 406 |
| focal length (mm) | 1.41 |
| NA | 0.85 |
| magnification | 0.000 |

TABLE 15

| Surface No. | r | d | n |
|---|---|---|---|
| 1 | 0.974 | 1.55 | 1.64951 |
| 2 | -5.174 | 0.48 | |
| 3 | ∞ | 0.0875 | 1.62096 |
| 4 | ∞ | — | |

TABLE 16

| | FIRST SURFACE (#1) | SECOND SURFACE (#2) |
|---|---|---|
| κ | -1.40000E+00 | -5.40000E+02 |
| A4 | 9.09287E-02 | 2.23382E-01 |
| A6 | 1.47856E-01 | -1.81118E-01 |
| A8 | -2.14511E-01 | -9.09561E-02 |
| A10 | 1.59414E-01 | 8.30447E-02 |
| A12 | -5.25529E-02 | 1.49547E-01 |
| A14 | 1.02472E-02 | -2.88597E-02 |
| A16 | -7.55609E-03 | -1.46822E-01 |
| A18 | 1.43518E-02 | -3.21639E-02 |
| A20 | -1.01468E-02 | 8.36610E-02 |
| A22 | 1.97383E-03 | 5.32861E-02 |
| A24 | 0.00000E+00 | -4.59528E-02 |
| A26 | 0.00000E+00 | 0.00000E+00 |
| A28 | 0.00000E+00 | 0.00000E+00 |
| A30 | 0.00000E+00 | 0.00000E+00 |

TABLE 17

| | Surface #1 |
|---|---|
| P2 | 7.00000E+00 |
| P4 | -6.80000E+01 |
| P6 | 2.33000E+02 |
| P8 | -3.78000E+02 |
| P10 | 2.55000E+02 |
| P12 | -6.38000E+01 |

With regard to the objective lens 10 (10B) according to the fifth example, the values of the intermediate terms of the conditions (1) and (2) are 0.506 and 0.30, respectively. Therefore, the conditions (1) and (2) (or the conditions (3) and (4)) are satisfied.

With regard to the objective lens 10 according to the fifth example, the tilt sensitivity is 0.477. That is, the objective lens 10 according to the fifth example is able to suppress the fluctuation of the amount of coma caused by the temperature change by satisfying the conditions (1) and (2) (or by satisfying the conditions (3) and (4)), while achieving the suitable optical performance of the information recording/reproducing for the optical disc D1. Consequently, it becomes possible to effectively avoid increase of the load placed on the tilt actuator 16 and decrease of the accuracy of correction for the coma.

With regard to the objective lens 10B according to the fifth example, the tilt property change amount is 0.051. That is, the objective lens 10B according to the fifth example is able to effectively suppress the amount of coma due to the temperature change by satisfying the conditions (1) and (2) (or the conditions (3) and (4)). Consequently, it becomes possible to form a suitable beam spot on the recording surface of the optical disc.

FIG. 11A is an aberration diagram of the objective lens 10 (10B) according to the fifth example under the condition of the design reference temperature (35° C.). FIG. 11B is an aberration diagram of the objective lens 10 (10B) according to the fifth example under the high temperature condition (80° C.). As shown in FIGS. 11A and 11B, both of the spherical aberration and the coma are suitably corrected in the design reference temperature condition and in the high temperature condition.

Sixth Example

Hereafter, a sixth example is explained. Table 18 shows the specifications of the objective lens 10 (10B) according to the sixth example. Table 19 shows a specific numerical configuration of the optical information recording/reproducing apparatus 100 (100B) according to the sixth example defined when the optical disc D1 is used. Table 20 shows the coefficients of each aspherical surface of the objective lens 10 (10B) according to the sixth example. Table 21 shows the coefficients for the optical path difference function $\phi(h)$ defining the annular zone structure formed on the first surface 11 of the objective lens 10 (10B).

TABLE 18

| | |
|---|---|
| wavelength (nm) | 406 |
| focal length (mm) | 1.41 |
| NA | 0.85 |
| magnification | 0.000 |

TABLE 19

| Surface No. | r | d | n |
|---|---|---|---|
| 1 | 0.901 | 1.70 | 1.52350 |
| 2 | −1.439 | 0.48 | |
| 3 | ∞ | 0.0875 | 1.62096 |
| 4 | ∞ | — | |

TABLE 20

| | FIRST SURFACE (#1) | SECOND SURFACE (#2) |
|---|---|---|
| κ | −1.40000E+00 | −2.85000E+01 |
| A4 | 1.35059E−01 | 3.01723E−01 |
| A6 | 5.64690E−02 | −5.53475E−01 |
| A8 | −5.39069E−02 | 6.34217E−01 |
| A10 | 5.79257E−02 | −3.76561E−01 |
| A12 | −5.64388E−02 | 5.10351E−02 |
| A14 | 5.66837E−02 | 4.47404E−02 |
| A16 | −2.76008E−02 | −4.50577E−02 |
| A18 | 5.50796E−04 | 3.99497E−02 |
| A20 | 4.35384E−03 | 4.82235E−02 |
| A22 | −9.92148E−04 | −9.38662E−02 |
| A24 | 0.00000E+00 | 3.69080E−02 |
| A26 | 0.00000E+00 | 0.00000E+00 |
| A28 | 0.00000E+00 | 0.00000E+00 |
| A30 | 0.00000E+00 | 0.00000E+00 |

TABLE 21

| | Surface #1 |
|---|---|
| P2 | 0.00000E+00 |
| P4 | −2.64000E+01 |
| P6 | 6.83000E+01 |
| P8 | −9.12000E+01 |
| P10 | 5.08000E+01 |
| P12 | −1.13000E+01 |

With regard to the objective lens 10 (10B) according to the sixth example, the values of the intermediate terms of the conditions (3) and (4) are 0.448 and 0.29, respectively. Therefore, the conditions (3) and (4) are satisfied.

With regard to the objective lens 10 according to the sixth example, the tilt sensitivity is 0.475. That is, the objective lens 10 according to the sixth example is able to suppress the fluctuation of the amount of coma caused by the temperature change by satisfying the conditions (3) and (4), while achieving the suitable optical performance of the information recording/reproducing for the optical disc D1. Furthermore, the objective lens 10 according to the sixth example of the first embodiment is designed such that the protective layer thickness defined when the offence against the sine condition SC and the spherical aberration SA are equal to each other at the 100% point of the effective beam radius is 0.129 (unit: mm). Therefore, the fluctuation of the coma due to the temperature change is also suppressed in this point of view. Consequently, it is possible to effectively avoid increase of the load placed on the tilt actuator 16 and decrease of the accuracy of correction for the coma.

With regard to the objective lens 10B according to the sixth example, the tilt property change amount is 0.084. That is, the objective lens 10B according to the sixth example is able to effectively suppress the amount of coma due to the temperature change by satisfying the conditions (3) and (4). Consequently, it becomes possible to form a suitable beam spot on the recording surface of the optical disc.

FIG. 12A is an aberration diagram of the objective lens 10 (10B) according to the sixth example under the condition of the design reference temperature (35° C.). FIG. 12B is an aberration diagram of the objective lens 10 (10B) according to the sixth example under the high temperature condition (80° C.). As shown in FIGS. 12A and 12B, both of the spherical aberration and the coma are suitably corrected in the design reference temperature condition and in the high temperature condition. As shown in FIG. 12A, under the design temperature condition, the offence against the sine condition SC has a local minimum value within the range larger than or equal to 20% and smaller than 80% of the effective beam radius, the offence against the sine condition SC has the maximum value within the range of 80% to 100% of the effective beam radius, and the maximum value falls within the range of 0.001 to 0.01. Therefore, as shown in FIG. 12B, the fluctuation of the amount of coma under the high temperature condition is suppressed considerably.

Seventh Example

Hereafter, a seventh example is explained. Table 22 shows the specifications of the objective lens 10 (10B) according to the seventh example. Table 23 shows a specific numerical configuration of the optical information recording/reproducing apparatus 100 (100B) according to the seventh example defined when the optical disc D1 is used. Table 24 shows the coefficients of each aspherical surface of the objective lens 10 (10B) according to the seventh example. Table 25 shows the coefficients for the optical path difference function $\phi(h)$ defining the annular zone structure formed on the first surface 11 (11B) of the objective lens 10 (10B).

TABLE 22

| | |
|---|---|
| wavelength (nm) | 406 |
| focal length (mm) | 1.41 |
| NA | 0.85 |
| magnification | 0.000 |

TABLE 23

| Surface No. | r | d | n |
|---|---|---|---|
| 1 | 0.882 | 1.70 | 1.52350 |
| 2 | −1.425 | 0.48 | |
| 3 | ∞ | 0.0875 | 1.62096 |
| 4 | ∞ | — | |

TABLE 24

| | FIRST SURFACE (#1) | SECOND SURFACE (#2) |
|---|---|---|
| κ | −1.40000E+00 | −2.80000E+01 |
| A4 | 1.36773E−01 | 3.16699E−01 |
| A6 | 1.01716E−01 | −5.64221E−01 |
| A8 | −1.41154E−01 | 6.39750E−01 |
| A10 | 1.13217E−01 | −3.51107E−01 |
| A12 | −5.53033E−02 | 2.29765E−02 |
| A14 | 4.41959E−02 | 3.10718E−02 |
| A16 | −2.62210E−02 | −2.75453E−02 |
| A18 | 3.85807E−03 | 5.79412E−02 |
| A20 | 2.24880E−03 | 4.12491E−02 |
| A22 | −6.36910E−04 | −1.15684E−01 |
| A24 | 0.00000E+00 | 4.95623E−02 |
| A26 | 0.00000E+00 | 0.00000E+00 |
| A28 | 0.00000E+00 | 0.00000E+00 |
| A30 | 0.00000E+00 | 0.00000E+00 |

TABLE 25

| | Surface #1 |
|---|---|
| P2 | 1.80000E+01 |
| P4 | −3.30000E+01 |
| P6 | 1.29000E+02 |
| P8 | −2.21000E+02 |
| P10 | 1.55000E+02 |
| P12 | −4.20000E+01 |

With regard to the objective lens 10 (10B) according to the seventh example, the values of the intermediate terms of the conditions (3) and (4) are 0.448 and 0.39, respectively. Therefore, the conditions (3) and (4) are satisfied.

With regard to the objective lens 10 according to the seventh example, the tilt sensitivity is 0.553. That is, the objective lens 10 according to the seventh example is able to suppress the fluctuation of the amount of coma caused by the temperature change by satisfying the conditions (3) and (4), while achieving the suitable optical performance of the information recording/reproducing for the optical disc D1. Furthermore, the objective lens 10 according to the seventh example of the first embodiment is designed such that the protective layer thickness defined when the offence against the sine condition SC and the spherical aberration SA are equal to each other at the 100% point of the effective beam radius is 0.129 (unit: mm). Therefore, the fluctuation of the coma is suppressed due to the temperature change is also suppressed in this point of view. Consequently, it is possible to effectively avoid increase of the load placed on the tilt actuator 16 and decrease of the accuracy of correction for the coma.

With regard to the objective lens 10B according to the seventh example, the tilt property change amount is 0.072. That is, the objective lens 10B according to the seventh example is able to effectively suppress the amount of coma due to the temperature change by satisfying the conditions (3) and (4). Consequently, it becomes possible to form a suitable beam spot on the recording surface of the optical disc.

FIG. 13A is an aberration diagram of the objective lens 10 (10B) according to the seventh example under the condition of the design reference temperature (35° C.). FIG. 13B is an aberration diagram of the objective lens 10 (10B) according to the seventh example under the high temperature condition (80° C.). As shown in FIGS. 13A and 13B, both of the spherical aberration and the coma are suitably corrected in the design reference temperature condition and in the high temperature condition. It is understood that the fluctuation of the amount of coma under the high temperature condition is suppressed considerably as in the case of the sixth example.

Eighth Example

Hereafter, an eighth example is explained. Table 26 shows the specifications of the objective lens 10 (10B) according to the eighth example. Table 27 shows a specific numerical configuration of the optical information recording/reproducing apparatus 100 (100B) according to the eighth example defined when the optical disc D1 is used. Table 28 shows the coefficients of each aspherical surface of the objective lens 10 (10B) according to the eighth example.

TABLE 26

| wavelength (nm) | 406 |
|---|---|
| focal length (mm) | 1.18 |
| NA | 0.85 |
| magnification | 0.000 |

TABLE 27

| Surface No. | r | d | n |
|---|---|---|---|
| 1 | 0.775 | 1.60 | 1.52350 |
| 2 | −0.878 | 0.29 | |
| 3 | ∞ | 0.0875 | 1.62096 |
| 4 | ∞ | — | |

TABLE 28

| | FIRST SURFACE (#1) | SECOND SURFACE (#2) |
|---|---|---|
| κ | −1.40000E+00 | −2.50000E+01 |
| A4 | 2.48360E−01 | 5.76417E−01 |
| A6 | −2.75662E−03 | −1.23927E+00 |
| A8 | 1.49310E−01 | 5.37876E−01 |
| A10 | −3.44288E−01 | 8.16404E−01 |
| A12 | 5.36282E−01 | −8.31103E−02 |
| A14 | −1.66189E−01 | −9.91185E−01 |
| A16 | −3.58250E−01 | −7.71942E−01 |
| A18 | 1.81282E−01 | 2.98438E−01 |
| A20 | 3.03450E−01 | 1.42143E+00 |
| A22 | −2.27412E−01 | 1.20146E+00 |
| A24 | 0.00000E+00 | −1.71067E+00 |
| A26 | 0.00000E+00 | 0.00000E+00 |
| A28 | 0.00000E+00 | 0.00000E+00 |
| A30 | 0.00000E+00 | 0.00000E+00 |

With regard to the objective lens 10 (10B) according to the eighth example, the value of the intermediate term of the condition (1) is 0.603. Therefore, the condition (1) is satisfied.

With regard to the objective lens 10 according to the eighth example, the tilt sensitivity is 0.530. That is, the objective lens 10 according to the eighth example is able to suppress the fluctuation of the amount of coma caused by the temperature change by satisfying the condition (1), while achieving the suitable optical performance of the information recording/ reproducing for the optical disc D1 as in the case of the first to third examples. Consequently, it becomes possible to effectively avoid increase of the load placed on the tilt actuator 16 and decrease of the accuracy of correction for the coma.

With regard to the objective lens 10B according to the eighth example, the tilt property change amount is 0.054. That is, by satisfying the condition (1), the objective lens 10B according to the eighth example is able to effectively suppress the amount of coma due to the temperature change as in the cases of the first to third example. Consequently, it becomes possible to form a suitable beam spot on the recording surface of the optical disc.

FIG. 14A is an aberration diagram of the objective lens 10 (10B) according to the eighth example under the condition of the design reference temperature (35° C.). FIG. 14B is an aberration diagram of the objective lens 10 (10B) according to the eighth example under the high temperature condition (80° C.). As shown in FIGS. 14A and 14B, both of the spherical aberration and the coma are suitably corrected in the design reference temperature condition and in the high temperature condition.

Ninth Example

Hereafter, a ninth example is explained. Table 29 shows the specifications of the objective lens 10 (10B) according to the ninth example. Table 30 shows a specific numerical configuration of the optical information recording/reproducing apparatus 100 (100B) according to the ninth example defined when the optical disc D1 is used. Table 31 shows the coefficients of each aspherical surface of the objective lens 10 (10B) according to the ninth example.

TABLE 29

| wavelength (nm) | 406 |
|---|---|
| focal length (mm) | 1.18 |
| NA | 0.85 |
| magnification | 0.000 |

TABLE 30

| Surface No. | r | d | n |
|---|---|---|---|
| 1 | 0.805 | 1.60 | 1.55903 |
| 2 | −1.041 | 0.29 | |
| 3 | ∞ | 0.0875 | 1.62096 |
| 4 | ∞ | — | |

TABLE 31

| | FIRST SURFACE (#1) | SECOND SURFACE (#2) |
|---|---|---|
| κ | −1.40000E+00 | −3.42000E+01 |
| A4 | 2.25287E−01 | 5.68237E−01 |
| A6 | −8.17546E−04 | −1.33032E+00 |
| A8 | 1.40738E−01 | 5.73926E−01 |
| A10 | −3.56659E−01 | 8.90660E−01 |
| A12 | 5.52158E−01 | −7.44152E−02 |
| A14 | −1.64820E−01 | −1.05411E+00 |
| A16 | −3.78243E−01 | −8.71159E−01 |
| A18 | 1.68445E−01 | 2.46096E−01 |
| A20 | 3.23331E−01 | 1.66931E+00 |
| A22 | −2.30008E−01 | 1.61084E+00 |
| A24 | 0.00000E+00 | −2.25127E+00 |

TABLE 31-continued

| | FIRST SURFACE (#1) | SECOND SURFACE (#2) |
|---|---|---|
| A26 | 0.00000E+00 | 0.00000E+00 |
| A28 | 0.00000E+00 | 0.00000E+00 |
| A30 | 0.00000E+00 | 0.00000E+00 |

With regard to the objective lens 10 (10B) according to the ninth example, the value of the intermediate term of the condition (1) is 0.644. Therefore, the condition (1) is satisfied.

With regard to the objective lens 10 according to the ninth example, the tiltسensitivity is 0.608. That is, the objective lens 10 according to the ninth example is able to suppress the fluctuation of the amount of coma caused by the temperature change by satisfying the condition (1), while achieving the suitable optical performance of the information recording/reproducing for the optical disc D1 as in the case of the first to third and eighth examples. Consequently, it becomes possible to effectively avoid increase of the load placed on the tilt actuator 16 and decrease of the accuracy of correction for the coma.

With regard to the objective lens 10B according to the ninth example, the tilt property change amount is 0.046. That is, by satisfying the condition (1), the objective lens 10B according to the ninth example is able to effectively suppress the amount of coma due to the temperature change as in the cases of the first to third and eighth examples. Consequently, it becomes possible to form a suitable beam spot on the recording surface of the optical disc.

FIG. 15A is an aberration diagram of the objective lens 10 (10B) according to the ninth example under the condition of the design reference temperature (35° C.). FIG. 15B is an aberration diagram of the objective lens 10 (10B) according to the ninth example under the high temperature condition (80° C.). As shown in FIGS. 15A and 15B, both of the spherical aberration and the coma are suitably corrected in the design reference temperature condition and in the high temperature condition.

Tenth Example

Hereafter, a tenth example is explained. Table 32 shows the specifications of the objective lens 10 (10B) according to the tenth example. Table 33 shows a specific numerical configuration of the optical information recording/reproducing apparatus 100 (100B) according to the tenth example defined when the optical disc D1 is used. Table 33 shows the coefficients of each aspherical surface of the objective lens 10 (10B) according to the tenth example.

TABLE 32

| wavelength (nm) | 406 |
|---|---|
| focal length (mm) | 1.18 |
| NA | 0.85 |
| magnification | 0.000 |

TABLE 33

| Surface No. | r | d | n |
|---|---|---|---|
| 1 | 0.886 | 1.60 | 1.64951 |
| 2 | −1.627 | 0.29 | |
| 3 | ∞ | 0.0875 | 1.62096 |
| 4 | ∞ | — | |

TABLE 34

| | FIRST SURFACE (#1) | SECOND SURFACE (#2) |
|---|---|---|
| κ | −1.40000E+00 | −7.80000E+01 |
| A4 | 1.74465E−01 | 4.04305E−01 |
| A6 | −5.29539E−03 | −1.35930E+00 |
| A8 | 1.04335E−01 | 8.52385E−01 |
| A10 | −2.44091E−01 | 9.61560E−01 |
| A12 | 2.94054E−01 | −3.11196E−01 |
| A14 | −7.18212E−03 | −1.29443E+00 |
| A16 | −2.73456E−01 | −1.12696E+00 |
| A18 | 6.58240E−02 | 2.99088E−01 |
| A20 | 2.13645E−01 | 2.77637E+00 |
| A22 | −1.35925E−01 | 4.30407E+00 |
| A24 | 0.00000E+00 | −6.63606E+00 |
| A26 | 0.00000E+00 | 0.00000E+00 |
| A28 | 0.00000E+00 | 0.00000E+00 |
| A30 | 0.00000E+00 | 0.00000E+00 |

With regard to the objective lens 10 (10B) according to the tenth example, the value of the intermediate term of the condition (1) is 0.749. Therefore, the condition (1) is satisfied.

With regard to the objective lens 10 according to the tenth example, the tilt sensitivity is 0.662. That is, the objective lens 10 according to the tenth example is able to suppress the fluctuation of the amount of coma caused by the temperature change by satisfying the condition (1), while achieving the suitable optical performance of the information recording/reproducing for the optical disc D1 as in the case of the first to third and eighth and ninth examples. Consequently, it becomes possible to effectively avoid increase of the load placed on the tilt actuator 16 and decrease of the accuracy of correction for the coma.

With regard to the objective lens 10B according to the tenth example, the tilt property change amount is 0.039. That is, by satisfying the condition (1), the objective lens 10B according to the tenth example is able to effectively suppress the amount of coma due to the temperature change as in the cases of the first to third and eighth and ninth examples. Consequently, it becomes possible to form a suitable beam spot on the recording surface of the optical disc.

FIG. 16A is an aberration diagram of the objective lens 10 (10B) according to the tenth example under the condition of the design reference temperature (35° C.). FIG. 16B is an aberration diagram of the objective lens 10 (10B) according to the tenth example under the high temperature condition (80° C.). As shown in FIGS. 16A and 16B, both of the spherical aberration and the coma are suitably corrected in the design reference temperature condition and in the high temperature condition.

Eleventh Example

Hereafter, an eleventh example is explained. Table 35 shows the specifications of the objective lens 10 (10B) according to the eleventh example. Table 36 shows a specific numerical configuration of the optical information recording/reproducing apparatus 100 (100B) according to the eleventh example defined when the optical disc D1 is used. Table 37 shows the coefficients of each aspherical surface of the objective lens 10 (10B) according to the eleventh example. Table 38 shows the coefficients for the optical path difference function φ(h) defining the annular zone structure formed on the first surface 11 (11B) of the objective lens 10 (10B).

TABLE 35

| wavelength (nm) | 406 |
|---|---|
| focal length (mm) | 1.18 |
| NA | 0.85 |
| magnification | 0.000 |

TABLE 36

| Surface No. | r | d | n |
|---|---|---|---|
| 1 | 0.773 | 1.56 | 1.52350 |
| 2 | −0.960 | 0.30 | |
| 3 | ∞ | 0.0875 | 1.62096 |
| 4 | ∞ | — | |

TABLE 37

| | FIRST SURFACE (#1) | SECOND SURFACE (#2) |
|---|---|---|
| κ | −1.40000E+00 | −3.00000E+01 |
| A4 | 1.77269E−01 | 5.17471E−01 |
| A6 | 6.87631E−02 | −1.04573E+00 |
| A8 | 3.15575E−01 | 1.14992E−01 |
| A10 | −5.50808E−01 | 9.41067E−01 |
| A12 | 4.19298E−01 | −2.30513E−01 |
| A14 | 1.62535E−03 | −7.15690E−01 |
| A16 | −3.80589E−01 | −9.92007E−02 |
| A18 | 1.08893E−01 | 9.62494E−01 |
| A20 | 3.32662E−01 | −4.90252E−01 |
| A22 | −2.32031E−01 | 0.00000E+00 |
| A24 | 0.00000E+00 | 0.00000E+00 |
| A26 | 0.00000E+00 | 0.00000E+00 |
| A28 | 0.00000E+00 | 0.00000E+00 |
| A30 | 0.00000E+00 | 0.00000E+00 |

TABLE 38

| | Surface #1 |
|---|---|
| P2 | −1.20000E+01 |
| P4 | −1.01000E+02 |
| P6 | 1.17000E+02 |
| P8 | 2.15000E+02 |
| P10 | −4.44000E+02 |
| P12 | 1.62000E+02 |

With regard to the objective lens 10 (10B) according to the eleventh example, the values of the intermediate terms of the conditions (1) and (2) are 0.603 and 0.32, respectively. Therefore, the conditions (1) and (2) (or the conditions (3) and (4)) are satisfied.

With regard to the objective lens 10 according to the eleventh example, the tilt sensitivity is 0.643. That is, the objective lens 10 according to the eleventh example is able to suppress the fluctuation of the amount of coma caused by the temperature change by satisfying the conditions (1) and (2) (or by satisfying the conditions (3) and (4)), while achieving the suitable optical performance of the information recording/reproducing for the optical disc D1 as in the case of the fourth and fifth examples. Consequently, it becomes possible to effectively avoid increase of the load placed on the tilt actuator 16 and decrease of the accuracy of correction for the coma.

With regard to the objective lens 10B according to the eleventh example, the tilt property change amount is 0.039. That is, by satisfying the conditions (1) and (2) (or the conditions (3) and (4)), the objective lens 10B according to the eleventh example is able to suppress the amount of coma due to the temperature change as in the cases of the fourth and fifth examples. Consequently, it becomes possible to form a suitable beam spot on the recording surface of the optical disc.

FIG. 17A is an aberration diagram of the objective lens 10 (10B) according to the eleventh example under the condition of the design reference temperature (35° C.). FIG. 17B is an aberration diagram of the objective lens 10 (10B) according to the eleventh example under the high temperature condition (80° C.). As shown in FIGS. 17A and 17B, both of the spherical aberration and the coma are suitably corrected in the design reference temperature condition and in the high temperature condition.

Twelfth Example

Hereafter, a twelfth example is explained. Table 39 shows the specifications of the objective lens 10 (10B) according to the twelfth example. Table 40 shows a specific numerical configuration of the optical information recording/reproducing apparatus 100 (100B) according to the twelfth example defined when the optical disc D1 is used. Table 41 shows the coefficients of each aspherical surface of the objective lens 10 (10B) according to the twelfth example. Table 42 shows the coefficients for the optical path difference function φ(h) defining the annular zone structure formed on the first surface 11 (11B) of the objective lens 10 (10B).

TABLE 39

| wavelength (nm) | 406 |
|---|---|
| focal length (mm) | 1.18 |
| NA | 0.85 |
| magnification | 0.000 |

TABLE 40

| Surface No. | r | d | n |
|---|---|---|---|
| 1 | 0.789 | 1.56 | 1.55903 |
| 2 | −1.141 | 0.30 | |
| 3 | ∞ | 0.0875 | 1.62096 |
| 4 | ∞ | — | |

TABLE 41

| | FIRST SURFACE (#1) | SECOND SURFACE (#2) |
|---|---|---|
| κ | −1.40000E+00 | −4.10000E+01 |
| A4 | 1.55766E−01 | 4.90657E−01 |
| A6 | 6.11134E−02 | −9.88163E−01 |
| A8 | 2.11962E−01 | 6.43488E−02 |
| A10 | −2.65241E−01 | 9.31868E−01 |
| A12 | 1.89498E−01 | −2.00048E−01 |
| A14 | 3.18450E−03 | −6.95943E−01 |
| A16 | −2.42977E−01 | −1.09207E−01 |
| A18 | 8.67740E−02 | 9.38546E−01 |
| A20 | 2.09212E−01 | −4.82013E−01 |
| A22 | −1.59385E−01 | 0.00000E+00 |
| A24 | 0.00000E+00 | 0.00000E+00 |
| A26 | 0.00000E+00 | 0.00000E+00 |
| A28 | 0.00000E+00 | 0.00000E+00 |
| A30 | 0.00000E+00 | 0.00000E+00 |

TABLE 42

| | Surface #1 |
|---|---|
| P2 | 6.00000E+00 |
| P4 | −1.14000E+02 |
| P6 | 1.02000E+02 |
| P8 | 1.88000E+02 |
| P10 | −2.78000E+02 |
| P12 | 6.01000E+01 |

With regard to the objective lens 10 (10B) according to the twelfth example, the values of the intermediate terms of the conditions (1) and (2) are 0.644 and 0.39, respectively. Therefore, the conditions (1) and (2) (or the conditions (3) and (4)) are satisfied.

With regard to the objective lens 10 according to the twelfth example, the tilt sensitivity is 0.647. That is, the objective lens 10 according to the twelfth example is able to suppress the fluctuation of the amount of coma caused by the temperature change by satisfying the conditions (1) and (2) (or by satisfying the conditions (3) and (4)), while achieving the suitable optical performance of the information recording/reproducing for the optical disc D1 as in the case of the fourth, fifth and eleventh examples. Consequently, it becomes possible to effectively avoid increase of the load placed on the tilt actuator 16 and decrease of the accuracy of correction for the coma.

With regard to the objective lens 10B according to the twelfth example, the tilt property change amount is 0.040. That is, by satisfying the conditions (1) and (2) (or the conditions (3) and (4)), the objective lens 10B according to the twelfth example is able to suppress the amount of coma due to the temperature change as in the cases of the fourth, fifth and eleventh examples. Consequently, it becomes possible to form a suitable beam spot on the recording surface of the optical disc.

FIG. 18A is an aberration diagram of the objective lens 10 (10B) according to the twelfth example under the condition of the design reference temperature (35° C.). FIG. 18B is an aberration diagram of the objective lens 10 (10B) according to the twelfth example under the high temperature condition (80° C.). As shown in FIGS. 18A and 18B, both of the spherical aberration and the coma are suitably corrected in the design reference temperature condition and in the high temperature condition.

Thirteenth Example

Hereafter, a thirteenth example is explained. Table 43 shows the specifications of the objective lens 10 (10B) according to the thirteenth example. Table 44 shows a specific numerical configuration of the optical information recording/reproducing apparatus 100 (100B) according to the thirteenth example defined when the optical disc D1 is used. Table 45 shows the coefficients of each aspherical surface of the objective lens 10 (10B) according to the thirteenth example. Table 46 shows the coefficients for the optical path difference function φ(h) defining the annular zone structure formed on the first surface 11 (11B) of the objective lens 10 (10B).

TABLE 43

| wavelength (nm) | 406 |
|---|---|
| focal length (mm) | 1.18 |
| NA | 0.85 |
| magnification | 0.000 |

TABLE 44

| Surface No. | r | d | n |
|---|---|---|---|
| 1 | 0.841 | 1.49 | 1.64951 |
| 2 | −2.358 | 0.31 | |
| 3 | ∞ | 0.0875 | 1.62096 |
| 4 | ∞ | — | |

TABLE 45

| | FIRST SURFACE (#1) | SECOND SURFACE (#2) |
|---|---|---|
| κ | −1.40000E+00 | −2.00000E+02 |
| A4 | 2.57395E−01 | 4.56426E−01 |
| A6 | −2.26001E−01 | −1.01224E+00 |
| A8 | 2.19096E−01 | −5.31823E−02 |
| A10 | −2.91332E−02 | 1.06397E+00 |
| A12 | 5.15758E−02 | 1.54080E−01 |
| A14 | 4.83508E−03 | −6.86386E−01 |
| A16 | −1.58650E−01 | −6.48764E−01 |
| A18 | 5.67765E−02 | 9.55546E−02 |
| A20 | 1.05986E−01 | 9.36833E−01 |
| A22 | −8.73484E−02 | −1.72100E−01 |
| A24 | 0.00000E+00 | −1.61295E−01 |
| A26 | 0.00000E+00 | 0.00000E+00 |
| A28 | 0.00000E+00 | 0.00000E+00 |
| A30 | 0.00000E+00 | 0.00000E+00 |

TABLE 46

| | Surface #1 |
|---|---|
| P2 | 1.20000E+01 |
| P4 | 8.07000E+01 |
| P6 | −3.96000E+02 |
| P8 | 3.45000E+02 |
| P10 | 4.81000E+01 |
| P12 | −1.36000E+02 |

With regard to the objective lens 10 (10B) according to the thirteenth example, the values of the intermediate terms of the conditions (1) and (2) are 0.697 and 0.30, respectively. Therefore, the conditions (1) and (2) (or the conditions (3) and (4)) are satisfied.

With regard to the objective lens 10 according to the thirteenth example, the tilt sensitivity is 0.765. That is, the objective lens 10 according to the thirteenth example is able to suppress the fluctuation of the amount of coma caused by the temperature change by satisfying the conditions (1) and (2) (or by satisfying the conditions (3) and (4)), while achieving the suitable optical performance of the information recording/reproducing for the optical disc D1 as in the case of the fourth, fifth, eleventh and twelfth examples. Consequently, it becomes possible to effectively avoid increase of the load placed on the tilt actuator 16 and decrease of the accuracy of correction for the coma.

With regard to the objective lens 10B according to the thirteenth example, the tilt property change amount is 0.026. That is, by satisfying the conditions (1) and (2) (or the conditions (3) and (4)), the objective lens 10B according to the thirteenth example is able to suppress the amount of coma due to the temperature change as in the cases of the fourth, fifth, eleventh and twelfth examples. Consequently, it becomes possible to form a suitable beam spot on the recording surface of the optical disc.

FIG. 19A is an aberration diagram of the objective lens 10 (10B) according to the thirteenth example under the condition of the design reference temperature (35° C.). FIG. 19B is an aberration diagram of the objective lens 10 (10B) according to the thirteenth example under the high temperature condition (80° C.). As shown in FIGS. 19A and 19B, both of the spherical aberration and the coma are suitably corrected in the design reference temperature condition and in the high temperature condition. Furthermore, the fluctuation of the amount of coma under the high temperature condition is suppressed considerably as in the case of the sixth and seventh examples.

Fourteenth Example

Hereafter, a fourteenth example is explained. Table 47 shows the specifications of the objective lens 10 (10B) according to the fourteenth example. Table 48 shows a specific numerical configuration of the optical information recording/reproducing apparatus 100 (100B) according to the fourteenth example defined when the optical disc D1 is used. Table 49 shows the coefficients of each aspherical surface of the objective lens 10 (10B) according to the fourteenth example.

TABLE 47

| wavelength (nm) | 406 |
|---|---|
| focal length (mm) | 1.41 |
| NA | 0.85 |
| magnification | 0.000 |

TABLE 48

| Surface No. | r | d | n |
|---|---|---|---|
| 1 | 0.919 | 1.85 | 1.52350 |
| 2 | −1.157 | 0.38 | |
| 3 | ∞ | 0.0875 | 1.62096 |
| 4 | ∞ | — | |

TABLE 49

| | FIRST SURFACE (#1) | SECOND SURFACE (#2) |
|---|---|---|
| κ | −1.40000E+00 | −2.43000E+01 |
| A4 | 1.46930E−01 | 4.18260E−01 |
| A6 | 8.86253E−03 | −9.32856E−01 |
| A8 | 4.85543E−04 | 1.15863E+00 |
| A10 | 3.59099E−02 | −4.58297E−01 |
| A12 | −5.04512E−02 | −3.32094E−01 |
| A14 | 4.59395E−02 | 8.11515E−03 |
| A16 | −2.05247E−02 | 2.83005E−01 |
| A18 | 4.87932E−03 | 3.04323E−01 |
| A20 | −1.97482E−03 | −1.07391E−01 |
| A22 | 9.62738E−04 | −6.69369E−01 |
| A24 | 0.00000E+00 | 4.36610E−01 |
| A26 | 0.00000E+00 | 0.00000E+00 |
| A28 | 0.00000E+00 | 0.00000E+00 |
| A30 | 0.00000E+00 | 0.00000E+00 |

With regard to the objective lens 10 (10B) according to the fourteenth example, the value of the intermediate term of the condition (1) is 0.487. Therefore, the condition (1) is satisfied.

With regard to the objective lens 10 according to the fourteenth example, the tilt sensitivity is 0.493. That is, the objective lens 10 according to the fourteenth example is able to suppress the fluctuation of the amount of coma caused by the temperature change by satisfying the condition (1), while achieving the suitable optical performance of the information recording/reproducing for the optical disc D1 as in the case of the first to third and eighth and tenth examples.

Furthermore, the objective lens 10 according to the fourteenth example is designed such that the protective layer thickness defined when the offence against the sine condition SC and the spherical aberration SC are equal to each other at the 100% point of the effective beam radius is 0.130 (unit: mm). FIG. 20 is an aberration diagram of the objective lens 10 according to the fourteenth example defined under the condition where the temperature is the design reference temperature (35° C.), the protective layer thickness of the optical disc being used is 0.110 (unit: mm) and the magnification is −0.0081. As can be seen from FIG. 20, with regard to the objective lens 10 according to the fourteenth example, the offence against the sine condition SC is corrected when the optical disc having a relatively large protective layer thickness is used under the design reference temperature condition (35° C.), and the offence against the sine condition SC and the spherical aberration SA become substantial equal to each other at the 100% point of the effective beam radius. Additionally, in this point of view, the objective lens 10 according to the fourteen the example is able to suppress the fluctuation of the amount of coma due to the temperature change. Accordingly, it becomes possible to effectively avoid increase of the load placed on the tilt actuator 16 and decrease of the accuracy of correction for the coma.

With regard to the objective lens 10B according to the fourteenth example, the tilt property change amount is 0.081. That is, the objective lens 10B according to the fourteenth example is able to effectively suppress the amount of coma due to the temperature change as in the case of the first to third and the eighth to tenth examples. Consequently, it becomes possible to form a suitable beam spot on the recording surface of the optical disc.

FIG. 21A is an aberration diagram of the objective lens 10 (10B) according to the fourteenth example under the condition of the design reference temperature (35° C.). FIG. 21B is an aberration diagram of the objective lens 10 (10B) according to the fourteenth example under the high temperature condition (80° C.). As shown in FIGS. 21A and 21B, both of the spherical aberration and the coma are suitably corrected in the design reference temperature condition and in the high temperature condition. Furthermore, the fluctuation of the amount of coma under the high temperature condition is suppressed considerably.

Comparative Example

Hereafter, a comparative example is explained. Table 50 shows the specifications of an objective lens according to the comparative example. Table 51 shows a specific numerical configuration of an optical information recording/reproducing apparatus according to the comparative example defined when the optical disc D1 is used. Table 52 shows the coefficients of each aspherical surface of the objective lens according to the comparative example.

TABLE 50

| wavelength (nm) | 406 |
| focal length (mm) | 1.77 |
| NA | 0.85 |
| magnification | 0.000 |

TABLE 51

| Surface No. | r | d | n |
|---|---|---|---|
| 1 | 1.120 | 2.00 | 1.52350 |
| 2 | −2.062 | 0.63 | |
| 3 | ∞ | 0.0875 | 1.62096 |
| 4 | ∞ | — | |

TABLE 52

| | FIRST SURFACE (#1) | SECOND SURFACE (#2) |
|---|---|---|
| κ | −1.40000E+00 | −3.41403E+01 |
| A4 | 8.11294E−02 | 1.08867E−01 |
| A6 | 3.39046E−03 | −9.85322E−02 |
| A8 | −2.00961E−03 | 5.45137E−02 |
| A10 | 1.03467E−02 | −1.34621E−02 |
| A12 | −1.04197E−02 | −2.96565E−03 |
| A14 | 5.82532E−03 | 2.20884E−03 |
| A16 | −8.71288E−04 | 1.62710E−04 |
| A18 | −6.65587E−04 | −2.99675E−04 |
| A20 | 3.54522E−04 | 5.74536E−05 |
| A22 | −5.15236E−05 | −1.03974E−05 |
| A24 | 0.00000E+00 | 2.91381E−06 |
| A26 | 0.00000E+00 | 0.00000E+00 |
| A28 | 0.00000E+00 | 0.00000E+00 |
| A30 | 0.00000E+00 | 0.00000E+00 |

With regard to the objective lens according to the comparative example, the values of the intermediate terms of the conditions (1) and (2) are 0.335 and 0.00, respectively. That is, the objective lens according to the comparative example is not provided with the annular zone structure. Therefore, the conditions (1) and (2) (or the conditions (3) and (4)) are not satisfied. Further, with regard to the objective lens according to the comparative example, the tilt sensitivity is −0.291. That is, since the objective lens according to the comparative example does not satisfy the condition (1), the objective lens has the high tilt sensitivity. Therefore, it becomes necessary to tilt the objective lens further under the high temperature condition. In this case, the load placed on the tilt actuator 16 increases, which is undesirable. Furthermore, since the objective lens according to the comparative example has a minus tilt sensitivity, the coma does not occur even when the objective lens is tilted under the temperature of 35° C. to 80° C. Therefore, a problem that the coma can not be corrected arises.

Further, with regard to the objective lens according to the comparative example, the tilt property change amount is 0.125. That is, the tilt property change amount of the objective lens according to the comparative example is large, and therefore the amount of coma due to the temperature change is not suppressed. Therefore, it is impossible to form a suitable beam on the recording surface of the optical dis.

FIG. 22A is an aberration diagram of the objective lens according to the comparative example under the condition of the design reference temperature (35° C.). FIG. 22B is an aberration diagram of the objective lens according to the comparative example under the high temperature condition (80° C.). As can be seen from FIGS. 22A and 22B, although the aberrations are corrected under the design reference temperature, a large amount of coma is caused under the high temperature condition.

According to the first to fourteenth examples and comparison with the comparative example, it is understood that, by satisfying at least the condition (1), it becomes possible to suppress the fluctuation of the amount of coma due to the temperature change while achieving the optical performance suitable for the information recording/reproducing for the high recording density optical disc. Therefore, it becomes possible to effectively avoid increase of the load placed on the tilt actuator 16 and decrease of the accuracy of correction of the coma.

Although the present invention has been described in considerable detail with reference to certain preferred embodiments thereof, other embodiments are possible.

For example, in the above described embodiment, the annular zone structure is formed only on the first surface 11 (11B) of the objective lens 10 (10B). However, annular zone structures may be respectively formed on both of the first and second surfaces 11 (11B) and 12 (12B) of the objective lens 10 (10B).

This application claims priority of Japanese Patent Applications No. P2008-295552, filed on Nov. 19, 2008, and No. P2008-295553, filed on Nov. 19, 2008. The entire subject matter of the applications is incorporated herein by reference.

What is claimed is:

1. An optical information recording/reproducing apparatus for recording information to and/or reproducing information from an optical disc based on a predetermined standard by using a light beam having a wavelength of λ (unit: nm), the optical information recording/reproducing apparatus comprising:

an objective lens that converges the light beam onto a recording surface of the optical disc and satisfies a condition:

$$0.40 < \frac{d \cdot (n-1)}{f^2} < 0.70 \quad (3)$$

where f represents a focal length (unit: mm) of the objective lens with respect to the wavelength λ, d represents a thickness (unit: mm) of the objective lens along an optical axis of the objective lens, and n represents a refractive index with respect to the wavelength λ;

a photoreceptor that receives the light beam reflected from the recording surface of the optical disc;

a detector that detects quality of a signal outputted by the photoreceptor based on the light beam reflected from the recording surface of the optical disc; and an objective lens driving unit configured to tilt the objective lens in a direction to improve the quality of the signal based on a result of detection by the detector, wherein:

at least one of surfaces of the objective lens is formed to be a phase shift surface having a phase shift structure including a plurality of refractive surface zones which are concentrically formed and are divided by minute steps, each of the steps being formed at a boundary between adjacent ones of the plurality of annular zones to give a predetermined optical path length difference to the light beam incident thereon;

when ($\Sigma\phi_{0.00\text{-}1.00}$) represents a sum of heights of all the steps formed in an effective beam diameter on the phase shift surface, and ($\Sigma\phi_{0.95\text{-}1.00}$) represents a sum of heights of the steps formed in a range of 95% to 100% of an effective beam radius with respect to the optical axis, the objective lens satisfies a condition:

$$0.2 < \frac{\left(\sum \phi_{0.95\text{-}1.00}\right)}{\left(\sum \phi_{0.00\text{-}1.00}\right)} < 0.6. \quad (4)$$

2. The optical information recording/reproducing apparatus according to claim 1, wherein the steps of the phase shift structure are defined by a following optical path difference function φ(h):

$$\phi(h)=(P_2 \times h^2+P_4 \times h^4+P_6 \times h^6+P_8 \times h^8+P_{10} \times h^{10}+P_{12} \times h^{12})m\lambda$$

where $P_2$, $P_4$, $P_6$ ... represent coefficients of the $2^{nd}$ order, $4^{th}$ order, $6^{th}$ order, h represents a height from the optical axis, and m represents a diffraction order at which diffraction efficiency is maximized.

3. The optical information recording/reproducing apparatus according to claim 1, wherein the objective lens is configured such that an offence against a sine condition takes a local minimum value within a range larger than or equal to 20% and smaller than 80% of the effective beam radius with respect to the optical axis, the offence against the sine condition takes a maximum value within a range of 80% to 100% of the effective beam radius, and the maximum value of the offence against the sine condition falls within a range of 0.001 to 0.01.

4. The optical information recording/reproducing apparatus according to claim 1, wherein the optical disc has a protective layer thickness of 0.05 to 0.15 (unit: mm).

5. The optical information recording/reproducing apparatus according to claim 1, wherein the objective lens is configured such that an offence against a sine condition and a spherical aberration become equal to each other at a 100% point of the effective beam radius when a protective layer thickness of the optical disc lies within a range of 0.105 to 0.15 (unit: mm).

6. The optical information recording/reproducing apparatus according to claim 1, wherein a numerical aperture NA of the objective lens defined on an optical disc side lies within a range of 0.8 to 0.87 when the light beam having the wavelength λ is used.

7. The optical information recording/reproducing apparatus according to claim 1, wherein the objective lens is made of resin.

8. The optical information recording/reproducing apparatus according to claim 1, wherein the refractive index n of the objective lens satisfies a condition:

$$1.4<n<1.7 \quad (5).$$

9. An objective lens for an optical information recording/reproducing apparatus for recording information to and/or reproducing information from an optical disc based on a predetermined standard, the optical disc having a protective layer thickness of 0.05 to 0.15 (unit: mm), the objective lens satisfying a condition:

$$0.40 < \frac{d \cdot (n-1)}{f^2} < 0.70 \quad (3)$$

where f represents a focal length (unit: mm) of the objective lens with respect to a light beam having a wavelength λ used for recording information to and/or reproducing information from the optical disc, d represents a thickness (unit: mm) of the objective lens along an optical axis of the objective lens, and n represents a refractive index with respect to the wavelength $\lambda$, at least one of surfaces of the objective lens being formed to be a phase shift surface having a phase shift structure including a plurality of refractive surface zones which are concentrically formed and are divided by minute steps, each of the steps being formed at a boundary between adjacent ones of the plurality of annular zones to give a predetermined optical path length difference to the light beam incident thereon;

when ($\Sigma\phi_{0.00-1.00}$) represents a sum of heights of all the steps formed in an effective beam diameter on the phase shift surface, and ($\Sigma\phi_{0.95-1.00}$) represents a sum of heights of the steps formed in a range of 95% to 100% of an effective beam radius with respect to the optical axis, the objective lens satisfying a condition:

$$0.2 < \frac{\left(\sum \phi_{0.95-1.00}\right)}{\left(\sum \phi_{0.00-1.00}\right)} < 0.6. \qquad (4)$$

10. The objective lens according to claim 9, wherein the optical disc has a protective layer thickness of 0.05 to 0.15 (unit: mm).

11. The objective lens according to claim 9,
wherein the steps of the phase shift structure are defined by a following optical path difference function $\phi(h)$:

$$\phi(h) = (P_2 \times h^2 + P_4 \times h^4 + P_6 \times h^6 + P_8 \times h^8 + P_{10} \times h^{10} + P_{12} \times h^{12}) m\lambda$$

where $P_2, P_4, P_6 \ldots$ represent coefficients of the $2^{nd}$ order, $4^{th}$ order, $6^{th}$ order, h represents a height from the optical axis, and m represents a diffraction order at which diffraction efficiency is maximized.

12. The objective lens according to claim 9,
wherein a numerical aperture NA of the objective lens defined on an optical disc side lies within a range of 0.8 to 0.87 when the light beam having the wavelength $\lambda$, is used.

13. The objective lens according to claim 9, wherein the objective lens is made of resin.

14. The objective lens according to claim 9, wherein the refractive index n of the objective lens satisfies a condition:

$$1.4 < n < 1.7 \qquad (5).$$

* * * * *